(12) United States Patent
Sajassi et al.

(10) Patent No.: US 10,320,658 B2
(45) Date of Patent: Jun. 11, 2019

(54) METHOD AND SYSTEM FOR ASYMMETRIC REDUNDANCY MECHANISMS IN MULTI-HOMED NETWORK ACCESS TOPOLOGIES

(71) Applicant: Cisco Technology, Inc., San Jose, CA (US)

(72) Inventors: Ali Sajassi, San Ramon, CA (US); Dezhong Cai, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 290 days.

(21) Appl. No.: 15/296,867

(22) Filed: Oct. 18, 2016

(65) Prior Publication Data

US 2018/0109444 A1 Apr. 19, 2018

(51) Int. Cl.
*H04L 12/703* (2013.01)
*H04L 12/24* (2006.01)
*H04L 12/741* (2013.01)
*H04L 12/761* (2013.01)
*H04L 12/707* (2013.01)

(52) U.S. Cl.
CPC .......... *H04L 45/28* (2013.01); *H04L 41/0893* (2013.01); *H04L 41/12* (2013.01); *H04L 45/74* (2013.01); *H04L 45/16* (2013.01); *H04L 45/22* (2013.01)

(58) Field of Classification Search
CPC ..... H04L 45/28; H04L 41/0893; H04L 41/12; H04L 45/74; H04L 45/16; H04L 45/22
See application file for complete search history.

(56) References Cited

U.S. PATENT DOCUMENTS

| | | | |
|---|---|---|---|
| 2005/0281194 A1* | 12/2005 | Sonoda | H04L 1/22 370/220 |
| 2012/0177054 A1 | 7/2012 | Pati | 370/395.53 |
| 2013/0148657 A1 | 6/2013 | Salam | 370/390 |
| 2014/0022890 A1 | 1/2014 | Dong | 370/219 |
| 2016/0021015 A1* | 1/2016 | Thoria | H04L 47/2483 370/235 |

OTHER PUBLICATIONS

"VXLAN Overview: Cisco Nexus 9000 Series Switches," 7 Pgs.
(Continued)

*Primary Examiner* — Melvin C Marcelo
(74) *Attorney, Agent, or Firm* — Campbell Stephenson LLP

(57) ABSTRACT

In one embodiment, a method is described. The method includes receiving a network communication at a network device of a redundancy group. The redundancy group comprises a plurality of network devices, and the plurality of network devices are addressed in a first network using an anycast address. The method further includes, if the network communication is received from the first network, forwarding the network communication into a second network. If the network communication is received from the second network, the method determines whether to forward the network communication into the first network based on a status of the network device in the redundancy group, and a result of a filtering operation.

22 Claims, 18 Drawing Sheets

(56) References Cited

OTHER PUBLICATIONS

Mahalingam, et al., "Virtual eXtensible Local Area Network (VXLAN): A Framework for Overlaying Virtualized Layer 2 Networks over Layer 3 Networks," Independent Submission—Request for Comments: 7348, Category: Informational, ISSN: 2070-1721, pp. 1-22.
"PICA8 White Box SDN: VXLAN VTEP Gateway with Pica 8 and VMware NSX," 2012-2015 Pica8 Inc., pp. 1-14.
Sajassi, et al., "RFC 7623—Provider Backbone Bridging Combined with Ethernet VPN (PBB-EVPN)," https://tools.ietf.org/html/rfc7623, Sep. 2015, pp. 1-23.
Sajassi, et al., "RFC 7432—BGP MPLS-Based Ethernet VPN," https://tools.ietf.org/html/rfc7432, Feb. 2015, pp. 1-26.
IEEE, "IEEE Standard for Local and metropolitan area networks—Media Access Control (MAC) Bridges and Virtual Bridged Local Area Networks", Clauses 25 and 26, IEEE Std 802.1Q, DOI 10.1109/IEEESTD.2011.600946, 2004.
Sajassi, et al., "A Network Virtualization Overlay Solution using EVPN," https://tools.ietf.org/html/draft-ietf-bess-evpn-overlay-01, Feb. 2015, pp. 1-24.

\* cited by examiner

METHOD AND SYSTEM FOR ASYMMETRIC REDUNDANCY MECHANISMS IN MULTI-HOMED NETWORK ACCESS TOPOLOGIES

FIELD OF THE INVENTION

The present disclosure relates generally to network communications, and more particularly methods and systems for asymmetric redundancy mechanisms in multi-homed network access topologies.

BACKGROUND

Communication networks allow network clients, such as computer systems, to exchange data with each other at ever-increasing speeds. Communication protocols define the techniques and formats that such devices use when exchanging data via the communication networks. Communication networks connect the devices over various media, such as optical, electrical, or wireless media, and/or a combination thereof. Further, such a network can include network devices that facilitate such communication. These network devices (such as switches, routers, and the like) provide, for example, routing functionality that can route data (e.g., carried in packets, datagrams, frames, or the like) from one point in the communications network to another, possibly within a larger communication network.

BRIEF DESCRIPTION OF THE DRAWINGS

The present disclosure may be better understood, and its numerous objects, features, and advantages made apparent to those skilled in the art by referencing the accompanying drawings.

Figure 1:
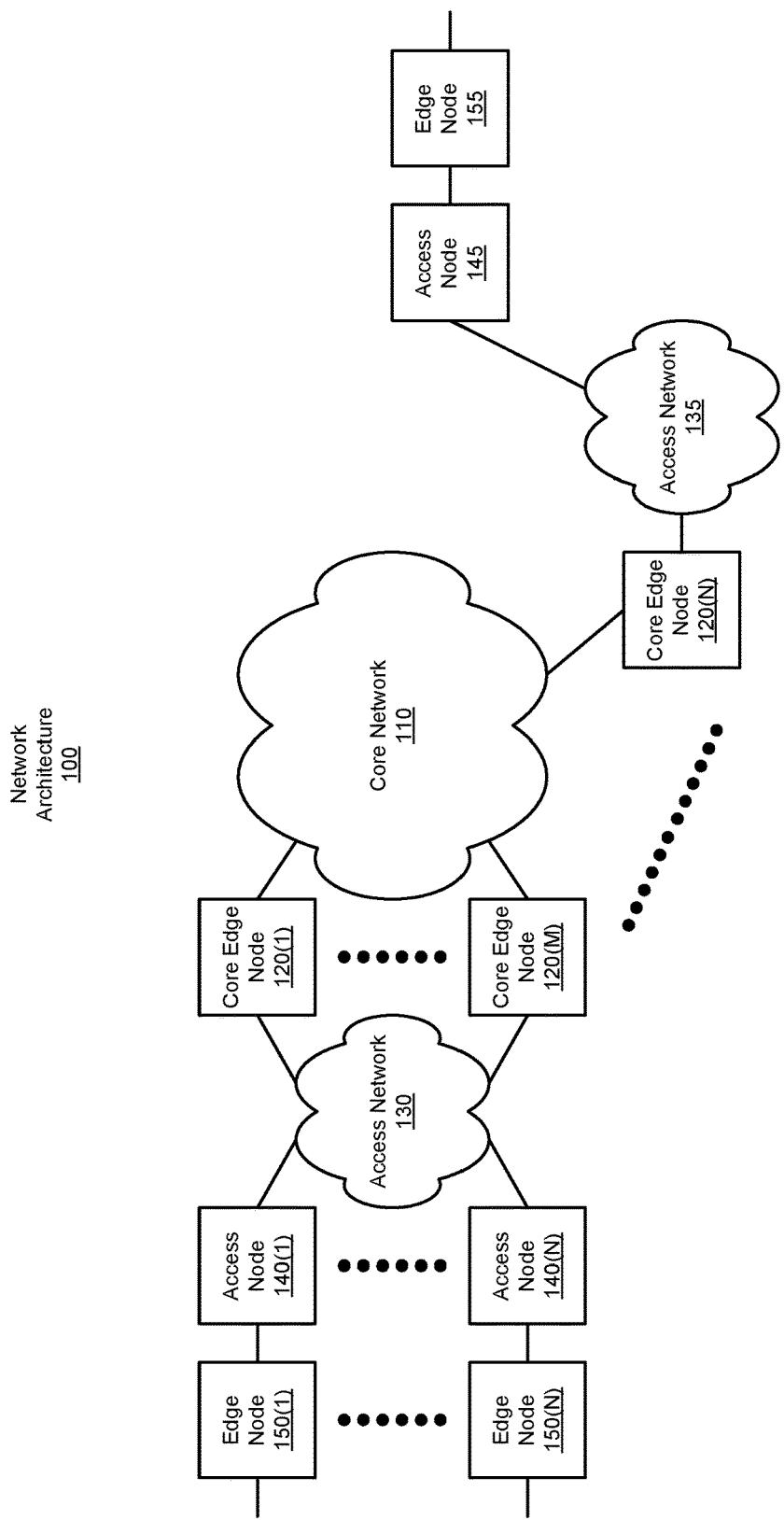
FIG. 1 is a block diagram illustrating an example of a simplified network architecture, according to one embodiment.

While embodiments such as those presented in the application are susceptible to various modifications and alternative forms, specific embodiments are provided as examples in the drawings and description of example embodiments. It should be understood that the drawings and description of example embodiments are not intended to limit the embodiments to the particular form disclosed. Instead, the intention is to cover all modifications, equivalents and alternatives falling within the spirit and scope of methods and systems such as those described herein, as defined by the appended claims.

DESCRIPTION OF EXAMPLE EMBODIMENTS

Overview

Methods and network devices are disclosed that support asymmetric redundancy mechanisms in multi-homed network access topologies. In one embodiment, a method therefor includes receiving a network communication at a network device of a redundancy group. The redundancy group comprises a plurality of network devices, and the plurality of network devices are addressed in a first network using an anycast address. The method further comprises, if the network communication is received from the first network, forwarding the network communication into a second network. If the network communication is received from the second network, the method determines whether to forward the network communication into the first network based on a status of the network device in the redundancy group, and a result of a filtering operation.

Example Embodiments

Methods and systems such as those described herein provide for asymmetric redundancy mechanisms in multi-homed network access topologies. In one embodiment, a designated forwarder (DF) election mechanism is employed, and can be employed, for example, in provider backbone bridging backbone (PBB)/virtual private network (VPN; more particularly, Ethernet VPN (EVPN)) environments. Such methods and systems address issues with anycast addresses (e.g., virtual extensible local area network (VX-LAN) tunnel endpoint (VTEP) addresses and quality-of-service (QoS) enforcement in such environments.

The approach to redundancy in network communications described herein addresses shortcomings of other alternatives that might be employed. Two potential alternatives are all-active redundancy and single-active redundancy. In using an all-active redundancy mode, a network device (or network) is multihomed to a group of two or more PEs, and all PEs belonging to such a redundancy group can forward network traffic to/from the multihomed network device (or network) for a given VLAN. In using a single-active redundancy mode, a network device (or network) is multihomed to a group of two or more PEs, and only a single PE in such a redundancy group can forward traffic to/from the multihomed network device (or network) for a given VLAN.

While these other redundancy modes can be employed, neither is capable of achieving the goals of implementations such as those described herein. For example, a challenge with an all-active redundancy mode is that network traffic arriving from the MPLS backbone is load-balanced among the PEs in the redundancy group. As such, it is not possible to reliably enforce quality-of-service (QoS) policies for network traffic in the backbone-to-access direction (outgoing, relative to the core network). In such scenarios, it cannot even be assumes that the traffic will get distributed evenly between the PEs due to the possibility of flows with considerable bandwidth demands, which is particularly true when load-balancing algorithms on the PEs do not take bandwidth into account in the hashing decision.

In the case of single-active redundancy mode, the challenge is that, based on the designated forwarder (DF) election, only one of the PBB-EVPN PEs will be forwarding traffic from access network to the core network. A designated forwarder (DF) can be used when customer edge devices (CEs) are multihomed to more than one provider edge (PE) device. Without a designated forwarder or similar construct, multihomed hosts could receive duplicate packets. Designated forwarders can be chosen for an Ethernet segment identifier (ESI) based on route advertisements.

At the same time, in view of the "distance" (the metric, as determined by the gateway protocol employed (e.g., the interior gateway protocol (IGP)), employed by such a gateway protocol to determine the cost (or desirability, in view of the parameters used in determining such a metric) of a given route within a network) between a given access node and the PEs belonging to the redundancy group (to which the access node is coupled), network traffic over the anycast tunnel may be delivered to a non-DF PE, where the network traffic is permanently dropped. This is because the DF election procedures, which are triggered by other gateway protocol (e.g., border gateway protocol (BGP)) exchanges, which are independent of the IGP path calculations. Further in this regard, it will be appreciated that relaxing the DF filtering rules will result in duplicate packets, and hence is not a viable option.

To address the foregoing problems, methods and systems such as those described herein define an asymmetric redundancy scheme, which can be used, for example, in PBB-EVPN environments. For PEs in multi-homed redundancy groups, such methods and systems employ an anycast addressing scheme on the access network side of such PEs (i.e., for network traffic destined for the MPLS backbone from the network segment (e.g., an Ethernet Segment; and so access network) in question, thereby having multiple (or even all) PEs in the redundancy group active), and DF election on the core network side of such PEs (i.e., for network traffic destined for the network segment (e.g., an Ethernet Segment; and so access network) in question from the MPLS backbone, thereby having one active PE in the redundancy group). Thus, for network traffic incoming to the core network from the AN(s), the network traffic is addressed to all the PEs in the given redundancy group, and so all those PEs receive the network traffic in question, irrespective of how the gateway protocol (e.g., IGP) directs the anycast network traffic. In this regard, it will be appreciated that a filtering operation such as Ethernet Segment split horizon filtering can be used to prevent looping of network traffic having unknown destination(s), such as broadcast/unknown unicast/multicast (BUM) network traffic. Moreover, since such mechanisms use DF election for network traffic destined for the network segment, the active PE can reliably enforce the applicable QoS policies.

Such a DF election procedure and the associated filtering mechanism appears as having all active PEs in the given redundancy group to the access network, as the result of the use of an anycast address and the PEs' ability to decide which PE in the redundancy group will act as the active PE. Conversely, when the network traffic is from the core network, the PEs in the redundancy group appear (e.g., to remote PEs) as single active PEs.

In one embodiment, B-MAC addresses (one per PE) can be associated with the multi-homed network devices. In such scenarios, each network segment (e.g., IP access node) can employ an anycast pseudowire. Remote PEs then associate customer/client addresses (e.g., customer media access control (C-MAC) addresses) to core network addresses (e.g., backbone media access control (B-MAC) addresses) for active flows. In so doing, the active flows can be associated with the path chosen by a gateway routing protocol or the like.

The DF election mechanism described herein uses split-horizon filtering, but rather than associating a single B-MAC address to the Ethernet Segment, this mechanism associates multiple B-MAC addresses with the Ethernet Segment (e.g., one B-MAC address per PE connected to the Ethernet Segment). Thus, when a PE receives a BUM network traffic flow from another PE in the redundancy group, that PE does not send that BUM network traffic flow over that network segment, even though the received source B-MAC address is different from its local B-MAC address associated with that Ethernet Segment. Thus, the status of a PE as DF/non-DF within a given redundancy group and filtering performed based on the following allow for the efficient management of network traffic in an efficient, effective manner.

Example Network Topologies

FIG. 1 is a block diagram illustrating an example of a simplified network architecture, according to one embodiment. To this end, FIG. 1 depicts a network architecture 100, which supports network communications between a number of network devices via a core network (depicted in FIG. 1 as a core network 110). Core network 110 is accessed via a number of core edge nodes (depicted in FIG. 1 as core edge nodes 120(1)-(N), referred to collectively as core edge nodes 120). Core edge nodes 120 are, in turn, coupled to one or more access networks (depicted in FIG. 1 as access networks 130 and 135), which facilitate network communications through core network 110 by managing access to core network 110 by networks/network devices coupled thereto. In the example depicted in FIG. 1, various local networks/network devices (not shown) communicate with access networks 130 and 135 (and so, via core network 110, with one another) via one or more access nodes (depicted in FIG. 1 as access nodes 140(1)-(N) and 145), to which the local networks/network devices are coupled via edge nodes (depicted in FIG. 1 as edge nodes 150(1)-(N) and 155). In this regard, while edge nodes 150(1)-(N) and 155 are shown in FIG. 1 as being coupled to corresponding ones of access nodes 140(1)-(N) and 145, such need not (and may well not) be the case. As will be appreciated in light of the present disclosure, in any given network topology, more than one of edge nodes 150(1)-(N) may be coupled to one of access nodes 140(1)-(N). Further, it will also be appreciated that, by operation of access network 150 and core edge nodes 120(1)-(M), more than one of access nodes 140(1)-(N) can be logically coupled to one of core edge nodes 120(1)-(M), as is demonstrated in certain of the subsequent figures.

Figure 2:
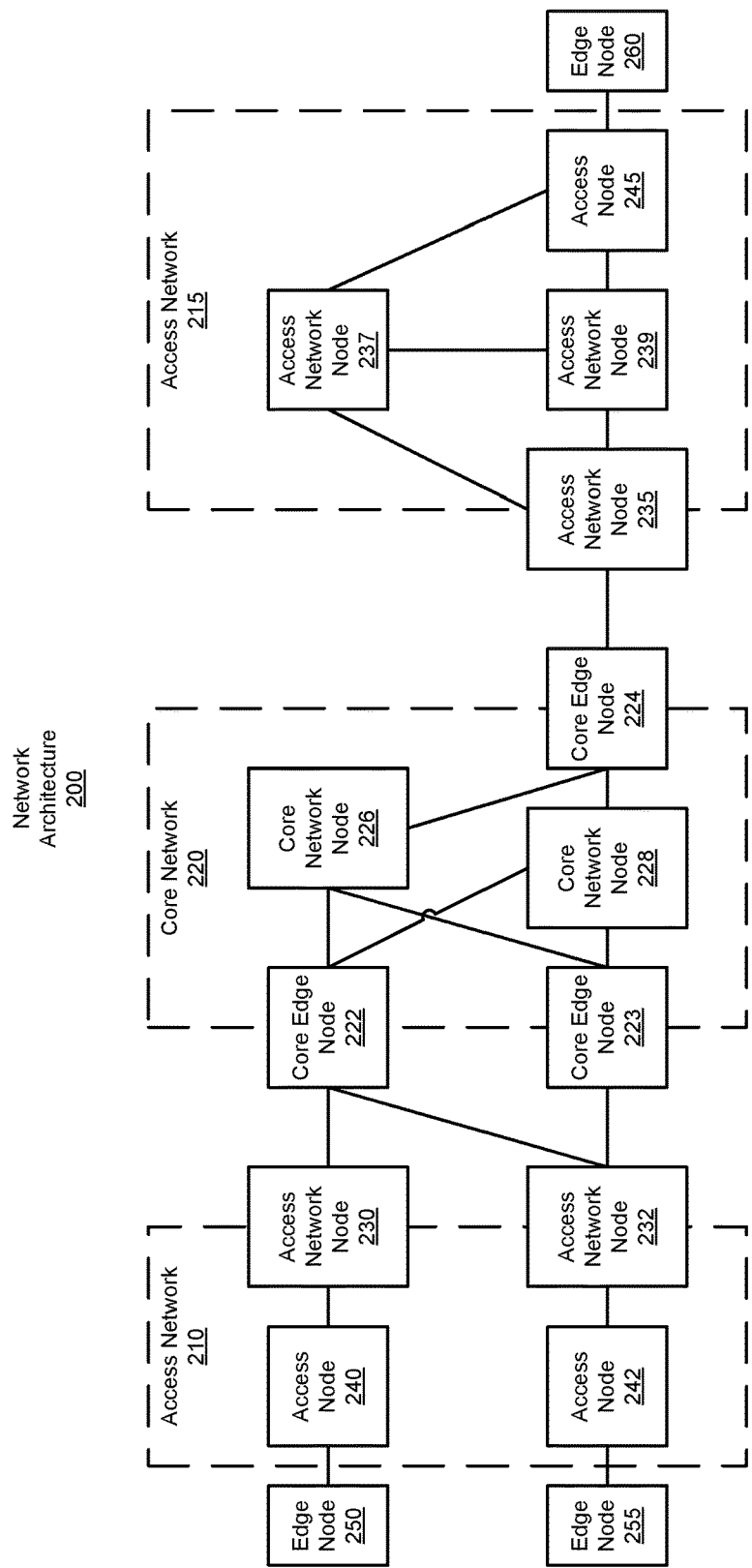
FIG. 2 is a block diagram illustrating an example of a simplified network architecture, according to one embodiment.

FIG. 2 is a block diagram illustrating an example of a simplified network architecture, according to one embodiment. FIG. 2 thus depicts a network architecture 200 in which an access network 210 and an access network 215 are coupled to one another by way of a core network 220. In the manner noted with regard to FIG. 1, network architecture 200 illustrates the logical connections between the networking devices depicted in FIG. 2. Thus, core network 220 includes a number of core edge nodes (depicted in FIG. 2 as core edge nodes 222, 223, and 224), and further includes one or more core network nodes (depicted in FIG. 2 as core network nodes 226 and 228), which are internal to core network 220. As noted, connections between ones of the core edge nodes and core network nodes of core network 220 depicted in FIG. 2 are logical in nature, and so can represent direct connections, connections via other nodes of core network 220, taken singly or in combination. Thus, the logical connections depicted in FIG. 2 within core network 220 are merely examples of such possible connections. Further, as will be appreciated in light of the present disclosure, core network 220 can include a variety of such nodes, both in interconnections and combination.

In turn, access network 210 includes access network nodes 230 and 232, while access network 215 includes access network nodes 235, 237, and 239. As with core network 220, access networks 210 and 215 can (and typically will) include additional internal nodes. Examples of such internal nodes are depicted in FIG. 2 as access network nodes 237 and 239. Core network 220 is coupled to access networks 210 and 215 at core edge nodes 222 and 223, and core edge node 224, respectively. In this regard, core edge nodes 222 and 223 are coupled variously to access nodes 240 and 242, while core edge node 224 is coupled to access node 245. Here again, access network 210 (and so too, access network 215) can, and typically will include a number of access network nodes and/or access nodes (which, in fact, need not differ from one another), coupled to one another in various ways.

Network communications between local network/network devices are supported via access networks 210 and 215, and core network 220 at various points within access networks 210 and 215. For example, with respect to access network 210, local network/network devices are coupled to access network 210 by way of edge nodes 250 and 255 (which are coupled access nodes 240 and 242, respectively), while other local networks/network devices are coupled to access network 215 by way of an edge node 260 (which is coupled access node 245). In being arranged/coupled in such a fashion, such access network nodes/access nodes can support one or more logical connections. An example of such logical connections is what is referred to as a pseudowire (or PWs; where a PW is, e.g., an emulation of a point-to-point connection over a packet-switched network).

In one embodiment, a network architecture such as network architecture 200 is implemented using a provider backbone bridging (PBB) technique that employs Ethernet virtual private network (VPN) (EVPN) techniques (referred to collectively as PBB-EVPN) is used to facilitate network communications in core network 220 and access networks 210 and 215. Such an implementation provides scalable multi-protocol label switching (MPLS) layer 2 (of the Open Systems Interconnect model) VPN services using a multi-protocol border gateway protocol (BGP) combined with PBB. Embodiments such as those described herein can, for example, use PBB-EVPN to aggregate internet protocol (IP) access networks over an MPLS backbone, while offering layer 2 VPN services in an end-to-end fashion. A network topology such as that depicted in FIG. 2 can be characterized as including three domains: a customer network, an IP access network, and an MPLS backbone.

In such an embodiment, a customer network connects to the access network in question (e.g., an internet protocol (IP) access network such as, in certain embodiments, access network 210) via a customer edge (CE) device (e.g., edge nodes 250 and 255). As noted, access network 210 includes not only one or more access nodes (ANs) to which such CEs are coupled (e.g., access nodes 240 and 242), but also IP core nodes (IPc). The ANs perform tunneling of Ethernet packets using an IP tunneling mechanism. In such an embodiment, the core network (MPLS backbone, in this example) includes PBB-EVPN provider edge nodes (PEs), as well as MPLS core nodes (P) (e.g., core net work nodes 226 and 228). The PBB-EVPN PEs terminate the IP tunnels which originate from the ANs in their local IP access network (and thus form the aforementioned end-to-end (CE-to-CE) connections).

In order to simplify operations and reduce the provisioning overhead on the ANs, as well as to provide resiliency, the PEs employ an anycast technique, in which the PEs in a redundancy group are assigned an anycast address as the tunnel destination, for tunnels originating from the ANs supported by the redundancy group. An example of an anycast network address is a network addressing and routing methodology in which datagrams from a single sender are routed to the topologically nearest node in a group of potential receivers, though the datagrams may be sent to several nodes, all identified by the same destination address. Thus, in an anycast addressing scheme, a one-to-nearest association is employed; datagrams are routed to a single member of a group of potential receivers, which are identified by the same destination address.

Preferably, in an embodiment such as that just described, support for multipoint layer 2 VPN services is provided that supports end-to-end (i.e. CE to CE) network communications, as noted. Also preferably, support for IP as well as non-IP payloads is also provided. As such, it is preferable that such methods and systems not rely on mechanisms such as address resolution protocol (ARP) or a neighbor discovery (ND) inspection mechanism, but rather on media access control (MAC) learning in the data plane. Also preferable in the PBB-EVPN arena is the use of IP (e.g., IP version 6 (IPv6)) as the underlying transport mechanism in the access network. In supporting such an approach in a PBB-EVPN environment, it is also preferable that:

Support be provided for VLAN multiplexing with Customer VLAN (C-Tag) transparency in IP tunnels;

Support be provided for VLAN aware service bundling over the IP tunnels on the PEs (meaning that the PE needs to be able to identify the layer 2 bridge domain based on the combination of the IP tunnel identifier and C-Tag (and/or service VLAN tag (S-Tag)));

Support be provided for local switching between IP tunnels on the PEs (desirable in view of an assumption that the ANs may not support any local switching/bridging functionality between their access ports);

Support be provided for hierarchical QoS with two levels in the hierarchy (e.g., per IP tunnel and per C-Tag (and/or S-tag));

Support be provided for resilient interconnect with protection against eventualities such as PE node failure, path failures in the IP access network, and IP tunnel; and Support be provided for anycast provisioning to configure anycast addresses as the tunnel destination on the PEs (in order to simplify provisioning of the ANs by eliminating the need to explicitly provision the ANs with the unicast IP addresses of the redundant PEs).

Figure 3:
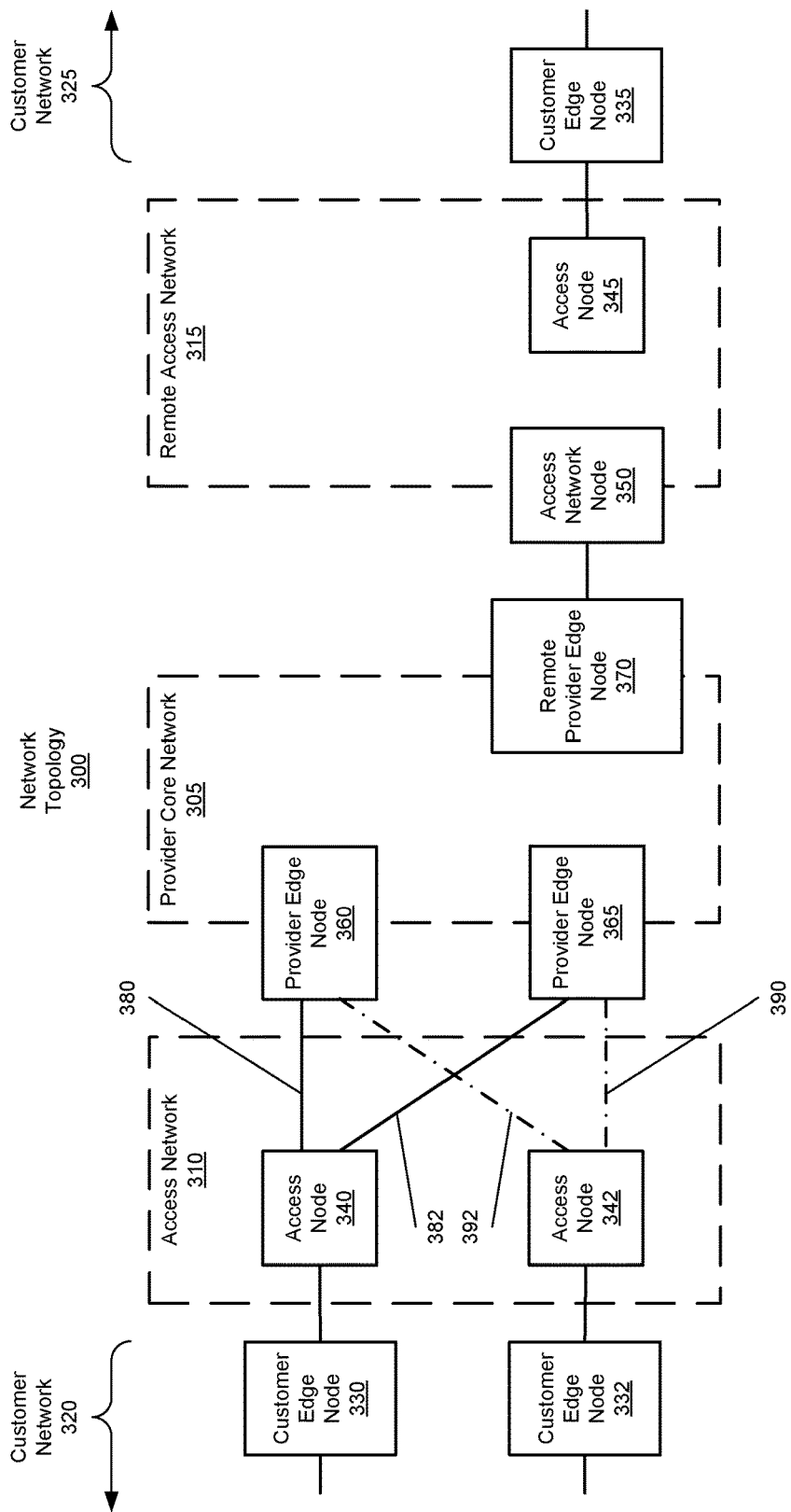
FIG. 3 is a block diagram illustrating an example of the range of sequence numbers, according to one embodiment.

FIG. 3 is a block diagram illustrating an example of a simplified network topology, according to one embodiment. FIG. 3 thus depicts a network topology 300, which is more conceptual in nature than the block diagrams of FIGS. 1 and 2. Network topology 300 is similar in form to network architecture 200 of FIG. 2, but illustrates an example of a more specific application of the inventive concepts described herein. That being the case, network topology 300 includes a core network (depicted in FIG. 3 as a provider core network 305), which couples two access networks (depicted in FIG. 3 as an access network 310 and remote access network 315). In a manner such as that described earlier, local networks/network devices (depicted in FIG. 3 as customer networks 320 and 325) are able to communicate with one another via provider core network 305 and access networks 310 and 315.

As part of customer network 320, customer edge nodes (depicted in FIG. 3 as customer edge nodes 330 and 332) couple the network devices within customer network 320 with access network 310. Similarly, the network devices of customer network 325 are coupled to remote access network 315 by a customer edge node 335. In support of network communications between the network devices of customer network 320 and provider core network 305, access network 310 includes access nodes 340 and 342. Similarly, the network devices of customer network 325 are coupled via customer edge node 335 to remote access 315 at access node 345.

As noted earlier, network topology 300 is a logical representation of the communications and network devices that logically support network communications between network devices of customer networks 320 and 325. As will be appreciated in light of the present disclosure, then, the depiction of network topology 300 in FIG. 3 reflects only those elements salient to the discussions herein. As will also be appreciated in light of the present disclosure, numerous and varied other communication paths, connect, network devices and other such elements are included in customer networks 320 and 325, access networks 310 and 315, and provider core network 305. To this end, remote access network 315 includes an access network node 350, which serves as an example of such other network devices. In support of the aforementioned network communications, provider core network 305 includes a number of provider edge nodes (depicted in FIG. 3 as provider edge nodes 360 and 365, and a remote provider edge node 370). As noted earlier, provider core network 305 will include, typically, more network devices than simply the three provider edge nodes depicted in FIG. 3, and will also typically include a number of core network nodes within provider core network 305.

Also depicted in FIG. 3 are logical connections between access node 340 and provider edge nodes 360 and 365 (which support of network communications from and to customer edge node 330), and those between access node 342 and provider edge nodes 360 and 365 (which support of network communications from and to customer edge node 332). Network communications between access node 340 and provider edge node 360 are depicted in FIG. 3 as a network communication path 380. Similarly, network communications between access node 340 and provider edge node 365 are depicted as a network communication path (pseudowire) 382. In comparable fashion, network communications between access node 342 and provider edge node 365 appear as a network communication path (pseudowire) 390, while network communications between access node 342 and provider edge node 360 appear as a network communication path (pseudowire) 392. As will be appreciated in light of the present disclosure, network communication paths (pseudowires) 380, 382, 390, and 392 represent dedicated logical connections between access nodes 340 and 342, and provider edge nodes 360 and 365, such as the earlier-mentioned pseudowires.

In the example presented in FIG. 3, each pair of pseudowires (e.g., pair of network communications paths 380 and 382 or pair of network communications paths 390 and 392) is treated as a network segment such as a virtual Ethernet Segment (vES) on the PBB-EVPN provider edge nodes (PEs). However, instead of having a single backbone media access control (B-MAC) address associated with each vES across all PEs in the redundancy group, each PE assigns a different B-MAC for each vES, because of the redundancy mechanism used for network traffic from the MPLS backbone (i.e., provider core network 305). This results in remote PEs (e.g., remote provider edge node 370) learning the customer MAC (C-MAC) addresses against the unique B-MAC of the active PE only. As will be appreciated in light of the present disclosure, the active PE is actually determined based on the destination PE (at which, the anycast network traffic is conveyed into the core), which is identified according the gateway protocol (e.g., IGP) distance between the access nodes and the PEs in the access network. It will be appreciated that traffic filtering based on DF election need only apply only to BUM network traffic (or that without a single known destination address) in such environments, and only for network traffic travelling towards the virtual Ethernet Segment.

With respect to the handling of known unicast traffic (network traffic with a single known destination), an access node (e.g. access node 340) forwards known unicast traffic over access network 310. The access network nodes of access network 310 convey the network traffic to one of the provider edge nodes of provider core network 305, based on the distance (e.g., the IGP distance) between the given access node and provider edge nodes in the redundancy group (e.g., provider edge nodes 360 and 365). In the case in which two (or more) of the provider edge nodes in the redundancy group are equidistant from the given access node (an equal cost multiple path (ECMP) scenario), the load-balancing algorithm (e.g., a hashing mechanism) employed by the access network nodes and access node in the access network determines which provider edge node will receive the network traffic.

In the example presented in connection with FIG. 3, the network traffic is assumed to be delivered to provider edge node 360. Provider edge node 360 encapsulates packets in the network traffic in a header (e.g., a PBB header), using the B-MAC address that is associated with the network segment (e.g., vES) corresponding to the pseudowire on which the traffic was received. The PE then adds the MPLS encapsulation and forwards the packets towards the destination remote PE (remote provider edge node 370, in this example). Remote provider edge node 370 learns the C-MAC against the B-MAC address associated with provider edge node 360. For network traffic in the reverse direction, remote provider edge node 370 forwards network traffic destined to that C-MAC to provider edge node 360.

The manner in which the PEs enforce the applicable QoS policies is a consideration, in the case in which multiple equal cost paths between an access nodes and the provider edge nodes in the redundancy group are present. Since such QoS policies need to be enforced on a per-pseudowire and per-C-Tag (and/or S-tag) basis on a PE, the access node ensures that network traffic of a given pseudowire is conveyed by way of the same PE. This can be accomplished, for example, by encoding the service identifier in the packet being conveyed (e.g., in the entropy field of a packet). For example, in the case of VXLAN, the VxLAN Network Identifier (VNI) can be hashed into the source user datagram protocol (UDP) port. Similarly, in the case of a generic routing protocol such as generic routing encapsulation (GRE), the service identifier can be hashed into the GRE key, which results in network traffic associated with a given pseudowire from an access node is conveyed to a single PE, even in the presence of ECMP.

With respect to the handling of BUM network traffic (essentially, network traffic without a single known destination), an remote PE node (e.g. PE node 370) forwards such BUM network traffic over provider core network 305. The PEs in a redundancy group perform a DF election procedure (e.g., that, in certain embodiments, takes into account load-balancing). As a result, only one of the PEs will be responsible for forwarding BUM network traffic received from the MPLS backbone towards the Ethernet Segment (i.e. IP access network). For example, assume that for a given service identifier (I-SID) (ISID1), provider edge node 360 is the DF for the vES associated with the pair of pseudowires to access node 340 (e.g., network communications paths 380 and 382), whereas provider edge node 365 is the DF for the vES associated with the pair of pseudowires to access node 342 (e.g., network communications paths 390 and 392). For BUM network traffic from the access network destined for the MPLS backbone, the network traffic is sent as a unicast from the access node to one of the PEs (depending on the IGP distance, or the ECMP hash in case of equidistant PEs). The ingress PE, which receives the BUM network traffic, floods that network traffic toward MPLS backbone. In this direction no DF election is needed because of the use of Anycast pseudowires.

For BUM network traffic sent by access node 340 to provider edge node 360, provider edge node 360 does not flood the network traffic towards access node 342, since provider edge node 360 is not the DF for the vES represented by the pair of network communication paths (pseudowires) 390 and 392. The ingress PE would flood the BUM network traffic to other PEs in the redundancy group. In this example, this means that PE1 will flood the BUM network traffic to provider edge node 362. These PEs need to apply the segment split-horizon filtering function to prevent the BUM network traffic from looping back into the originating access node (here, access node 34). To achieve this, a new procedure is added to standard PBB-EVPN whereby the PE examines the source B-MAC address on the BUM network traffic, and determines that this B-MAC is associated with a local vES. As such, the PE does not flood the BUM network traffic over that specific vES, and so implements a split-horizon mechanism. Thus, rather than a single B-MAC being associated with a given network segment identifier (e.g., an Ethernet Segment Identifier (ESI)), multiple B-MACs are associated with the same network segment identifier. As will be appreciated in light of the present disclosure, the PE in question forwards the BUM network traffic on other virtual Ethernet Segments (e.g., vES's) in the same bridge domain, and for which that PE is the assigned DF. Returning to FIG. 3, provider edge node 365 in this case would forward the BUM network traffic received from provider edge node 360 towards access node 342, but not towards access node 340.

For BUM network traffic sent by access node 340 to provider edge node 360, provider edge node 360 does not flood the BUM network traffic towards access node 342, since provider edge node 360 is not the DF for that network segment (e.g., the vES of access node 342). The ingress PE (here, provider edge node 360) floods the BUM network traffic to other PEs in the redundancy group (e.g., provider edge node 365 and 370). In the present example, this means that provider edge node 360 floods the BUM network traffic to provider edge node 365. This PE (e.g., 365) applies a segment split-horizon filtering function to prevent the BUM network traffic from looping back into the originating access node. To achieve this, a procedure is followed whereby each PE examines the source B-MAC address on the BUM network traffic, and identifies the source B-MAC address as being associated with a local network segment. In such a case, the PE does not flood the BUM network traffic over that specific network segments a result of the split-horizon filtering employed. Here, rather than a single B-MAC being associated with a given network segment identifier, multiple B-MACs are associated with the same network segment identifier. As will be appreciated in light of the present disclosure, the PE in question forwards the BUM network traffic on other virtual network segment in the same bridge domain, and for which it is the assigned DF. Returning to FIG. 3, provider edge node 365 forwards the BUM network traffic received from provider edge node 360 towards access node 342, but not towards access node 340.

Example Processes

Figure 4:
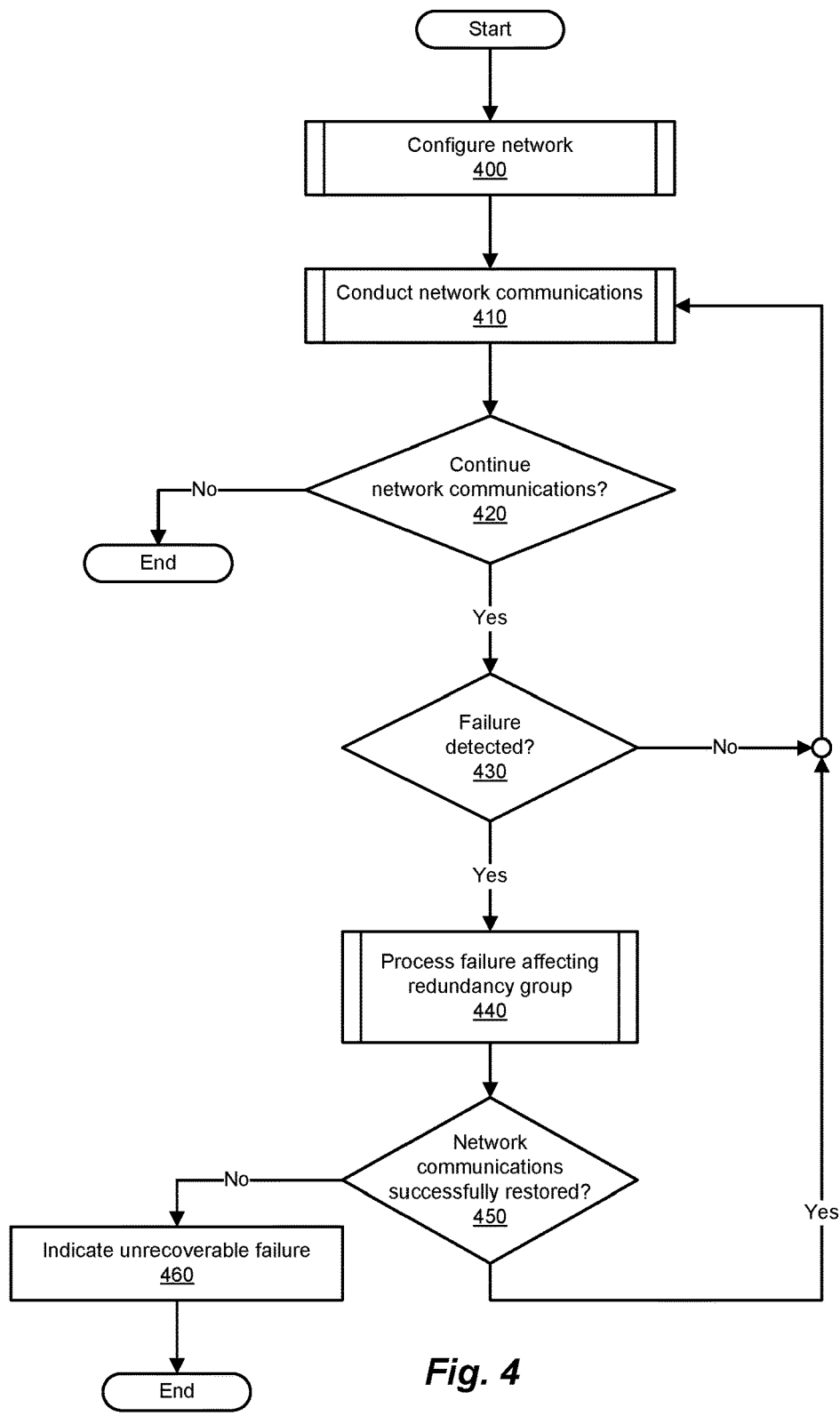
FIG. 4 is a simplified flow diagram illustrating an example of a process for network configuration, according to one embodiment.

FIG. 4 is a simplified flow diagram illustrating an example of a process for network operations, according to one embodiment. The process of FIG. 4 begins with the configuration of the various network devices that will make up the various network segments (e.g., virtual Ethernet Segments), network paths, and/or other sub-portions of the topology over which the network communications will occur (400). Once such configuration operations have been performed, network communications can then be conducted (410). Such network communications proceed until such time as the network communications conclude (420). In the alternative, such network communications continue (420), until such time as a failure is detected (430). If no failure is detected, network communications can continue (410). If a failure is detected, the failure affecting the redundancy group is processed (440), in an attempt to restore network communications. A determination is then made as to whether network communications were successfully restored (450). If the failure was processed successfully, normal network communications resume (410). Otherwise, the network management system indicates that the failure could not be successfully addressed (460), and the process concludes.

As will be appreciated in light of the present disclosure, while operations related to the configuration of network devices such as those described in connection with FIG. 4 are illustrated as being performed in a serial fashion, and in the order depicted, such need not be the case. The particular operations depicted therein, their order, and the serial nature of their presentation are merely for ease of explanation. Other such operations can be added or substituted therefor, and such operations can be also performed in parallel (in whole or in part). For example, portions of such a network communications path can be configured as such network communications progress (e.g., as a first packet from a customer edge node traverses the various networks involved).

Figure 5:
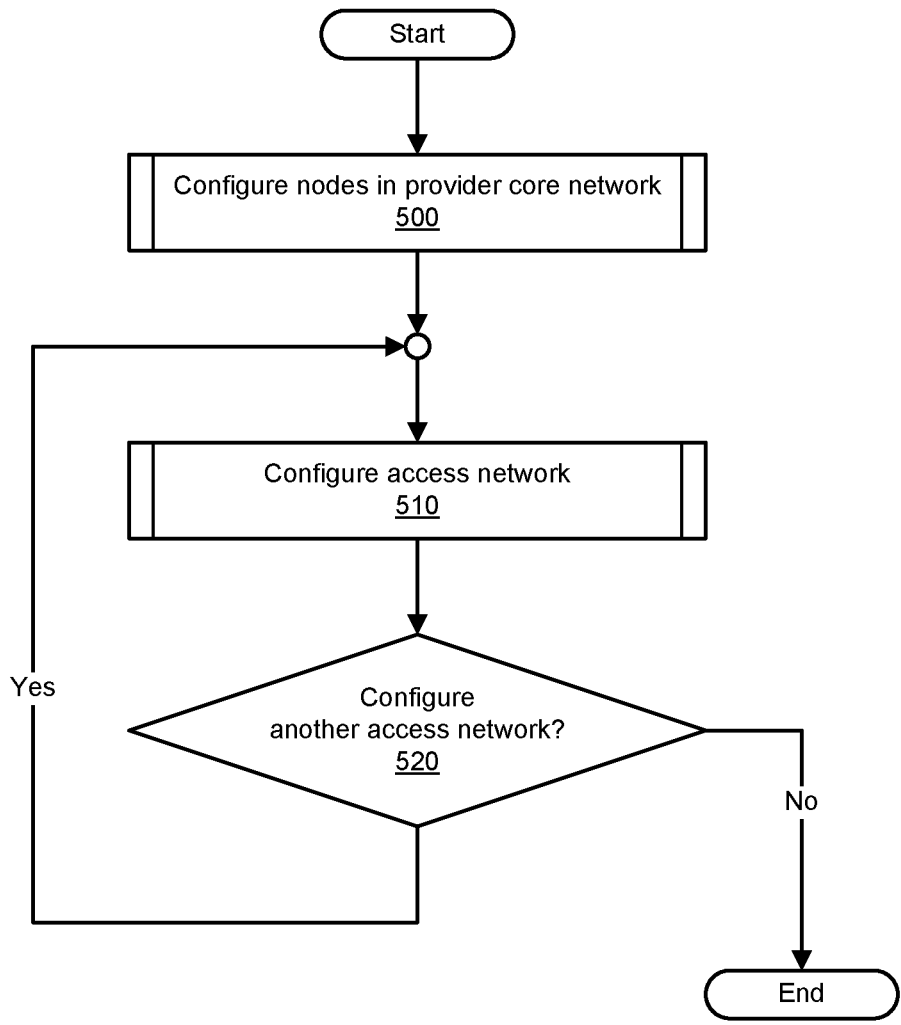
FIG. 5 is a simplified flow diagram illustrating an example of a process for network configuration, according to one embodiment.

FIG. 5 is a simplified flow diagram illustrating an example of a process for network configuration, according to one embodiment. The process of FIG. 5, which is generally directed to configuring the network devices involved, sub-portions of one or more networks, and the network as a whole, begins with the configuration of nodes within the provider core network (500). Next, one of the access networks that will make up the overall network path supporting the network communications is configured (510). A determination is then made as to whether other access networks remain to be configured (520). If other access networks remain to be configured, the configuration process loops to the configuration of the next access network (510). Alternatively, in the case in which no further access networks need be configured, the process concludes. As noted with regard to FIG. 4, configuration of a core network (e.g., provider core network 305) and various access networks (e.g., access networks 310 and 315) need not be performed in the serial fashion or order suggested by the process of FIG. 5. On the contrary, such configuration operations can proceed in a parallel fashion, as between the provider core network(s) and the access network(s) involved, and even to the level of the network devices involved.

Figure 6:
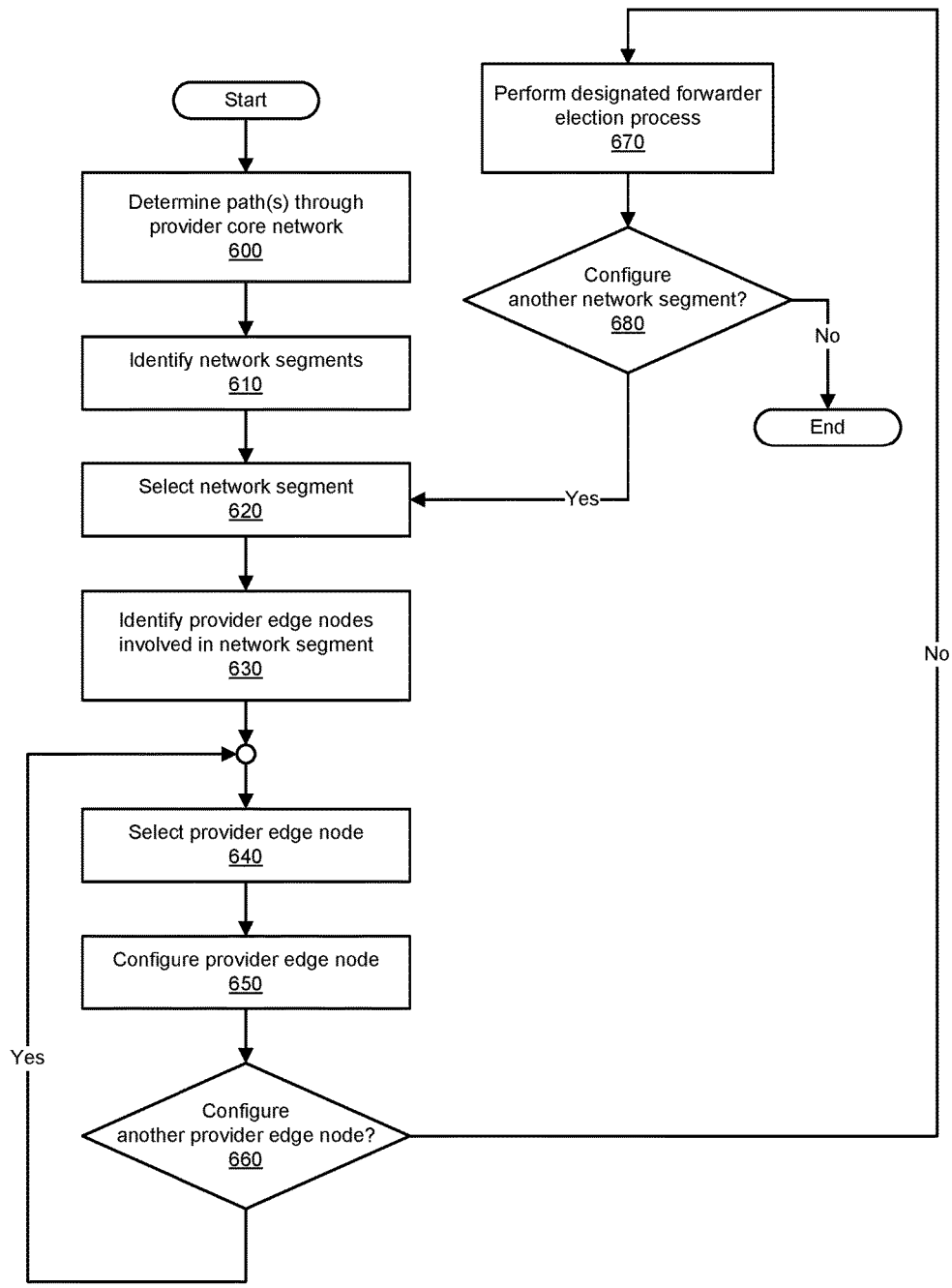
FIG. 6 is a simplified flow diagram illustrating an example of a process for configuring network devices in a core network, according to one embodiment.

FIG. 6 is a simplified flow diagram illustrating an example of a process for configuring network devices in a core network, according to one embodiment. The process of configuring network devices of the provider core network depicted in FIG. 6 begins with a determination as to the path or paths through the provider core network that are to be configured (600). Next, one or more network segments are identified (610). As will be appreciated in light of the present disclosure, while the operations described in the present disclosure are, in certain cases, referred to as network segments, such terminology is used nearly for simplicity of presentation, and other sub-divisions of networks and related technologies and techniques can be employed to equally good effect. The network segments involved having been identified, one of the network segments is then selected (620). One or more provider edge nodes involved in the network segment are then identified (630). As will be appreciated in light of the present disclosure, multiple provider edge nodes in a given segment form redundancy groups that can, by way of methods and systems such as those described herein, facilitate resilience in network communications between edge nodes such as customer edge nodes 330 and 332, and customer edge node 335, of FIG. 3. Of the provider edge nodes thus identified, a provider edge node is selected (640), and configured in a manner appropriate to effect the requisite network connections, configuration, and related functions (650). A determination is then made as to whether another provider edge node needs to be configured (660). If other provider edge nodes are to be configured, the process of configuring the core network loops to the selection of the next provider edge node within the network segment (640). Alternatively, if the provider edge nodes in the network segment have been configured, the process of core network configuration proceeds to performing a designated forwarder election process (670). A designated forwarder having been elected, a determination is made as to whether other network segments remain to be configured (680). If further network segments remain to be configured, the process of core network configuration proceeds to the selection of the next network segment (620). Alternatively, if the network segments to be configured have been so configured, the process concludes.

Figure 7:
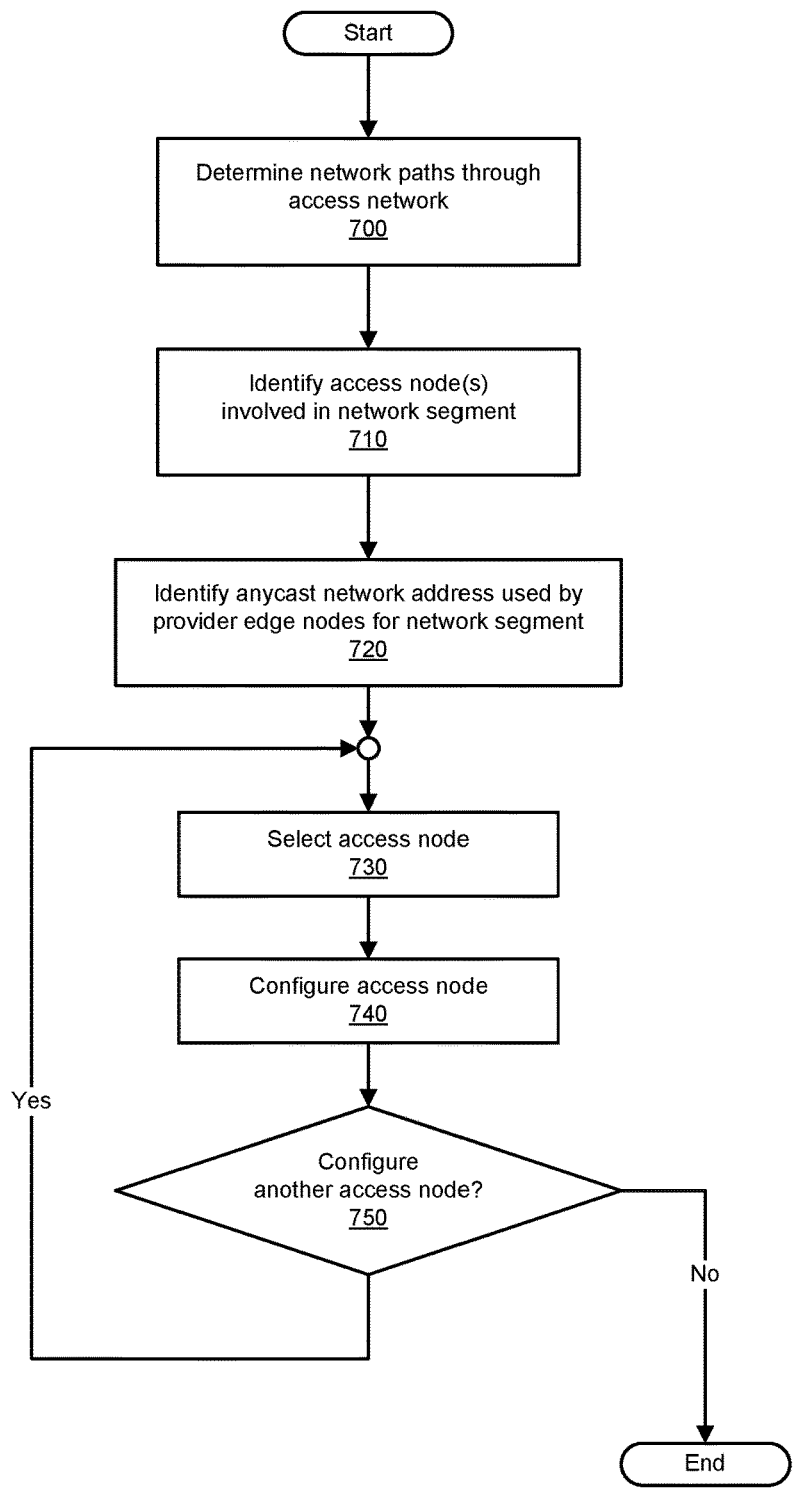
FIG. 7 is a simplified flow diagram illustrating an example of a process for configuring one or more access network nodes, according to one embodiment.

FIG. 7 is a simplified flow diagram illustrating an example of a process for configuring one or more access network nodes, according to one embodiment. The process of configuring access network nodes depicted in FIG. 7 begins with a determination as to the one or more network paths through the access network that network traffic is to take (700). Such determinations (also referred to as routing) can be made as part of the operation of a gateway protocol such as the interior gateway protocol (IGP). Such network paths can, for example, be implemented using network segments or other similar constructs. With such network nodes having been determined, the one or more access nodes of the access network nodes involved in the given network segment are identified (710). Next (or in parallel therewith), the anycast network address to be used by the provider edge nodes for the given network segment is identified.

At this point, the relevant access nodes can be configured. To this end, one of these access nodes is selected (730), and configured (740), with the appropriate parameters and other relevant information, including the aforementioned anycast network address. A determination is then made as to whether other access nodes remain to be configured (750). If further access nodes need configuration, the process of configuring the access network nodes loops to the selection of the next access node (730) and its configuration (740). Otherwise, the process concludes.

Figure 8:
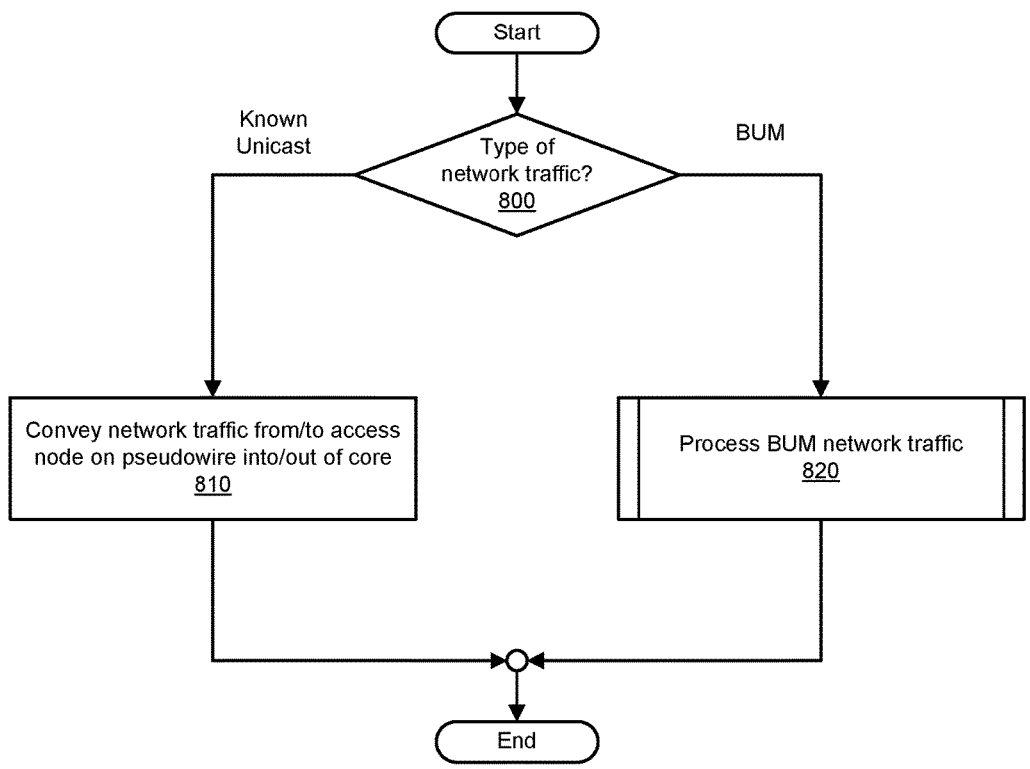
FIG. 8 is a simplified flow diagram illustrating an example of a process for conducting network communications, according to one embodiment.

FIG. 8 is a simplified flow diagram illustrating an example of a process for conducting network communications, according to one embodiment. FIG. 8 thus presents example operations that can be performed in conducting network communications between edge nodes (e.g., customer edge nodes 330 and 332, and customer edge node 335, of FIG. 3), such as those operations envisioned by the network communications described in connection with operation 410 of FIG. 4, from the perspective of a core edge node (e.g., one of provider edge nodes 360 or 365 of FIG. 3). As will be appreciated from the present disclosure, and the descriptions in FIG. 8, the network communications discussed and described in connection with FIG. 8 are both those network communications travelling into the core network and out of the core network. As such, the process depicted in FIG. 8 is concerned with the type of network traffic that is being conveyed, as a point of discussion for distinguishing there between.

The process of FIG. 8 begins with making a determination as to the type of network traffic received (800). In the process depicted in FIG. 8, a determination is made as to whether the network traffic as a known unicast (the transmission of messages to a single network destination identified by a unique address) or a "BUM" (Broadcast/Unknown unicast/Multicast) network traffic type. Known unicast network traffic, being directed to a single known destination address, uses addressing that provides a one-to-one association between destination address and network endpoint: each destination address uniquely identifies a single receiver endpoint. On the other hand, the network traffic type may be BUM network traffic, which delineates network addresses to which the traffic is destined as being one of broadcast, unknown unicast, or multicast. As will be appreciated in light of the present disclosure, the salient difference between these two network traffic types (known unicast and BUM) is the question of their destination(s) and potential route(s).

Broadcast addressing uses a one-to-many association; datagrams are routed from a single sender to multiple endpoints simultaneously in a single transmission. The network automatically replicates datagrams as needed for all network segments (links) that contain an eligible receiver. Multicast addressing uses a one-to-unique many association; datagrams are routed from a single sender to multiple selected endpoints simultaneously in a single transmission. Unknown unicast traffic flows contain unicast datagrams with unknown destination addresses. By default, a network device floods such unknown unicast packets (e.g., in a virtual local area network VLAN) to all interfaces (e.g., that are members of the VLAN).

Thus, in the case of known unicast, the network traffic in question can simply be conveyed from/to the access node in question on a pseudowire into/out of the core network (810). The process of FIG. 8 can then conclude, and so provide for continued network communications based on the flow diagrams described earlier. In the case of network traffic that is of a BUM network traffic type, more than one potential destination will exist within the access and core networks, and so is reflected as a separate process, in which such BUM network traffic is processed (820). As before, once the BUM network traffic has been processed, the process concludes, and so proceeds to continued network communications as per the flow diagrams described earlier.

Figure 9:
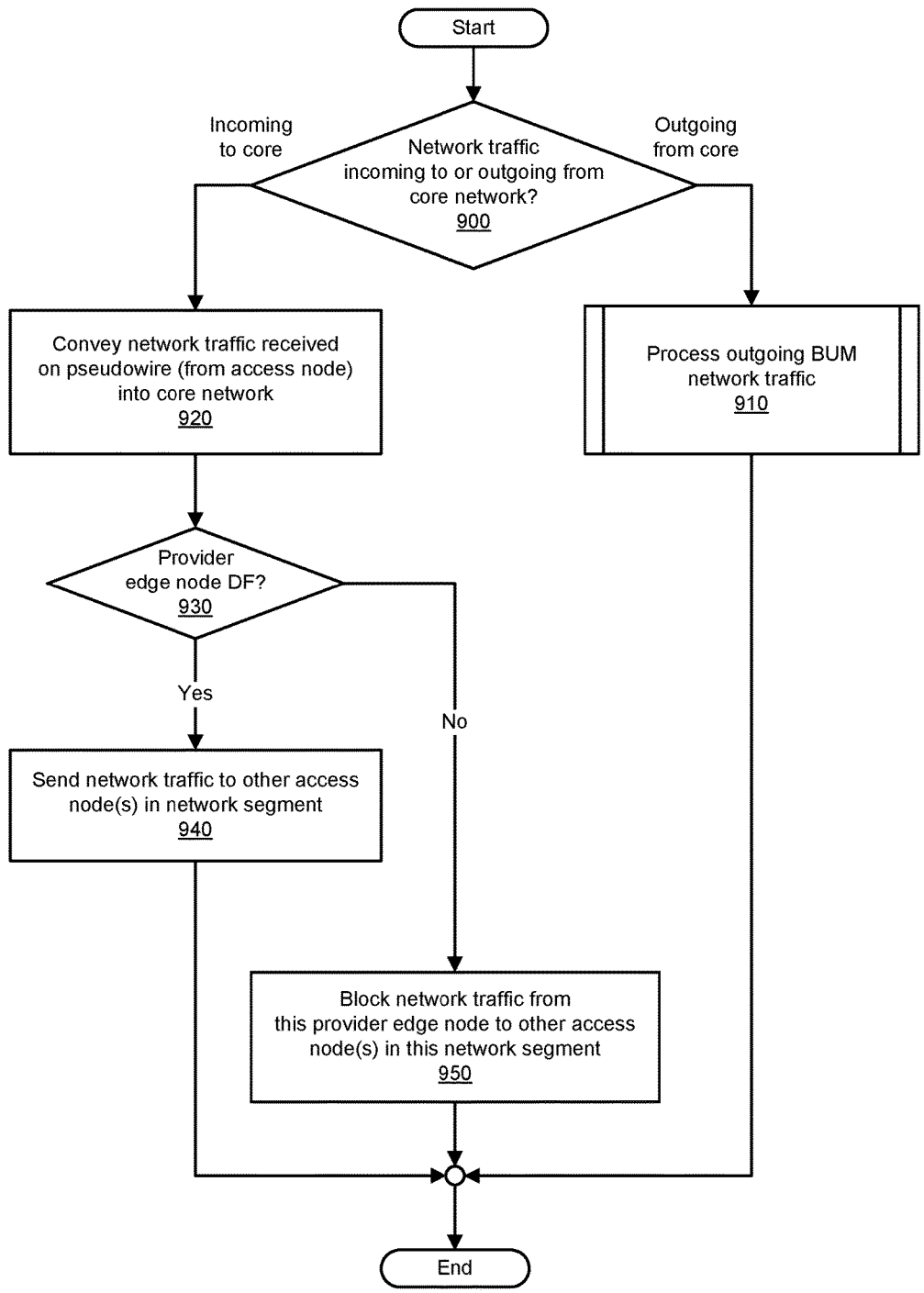
FIG. 9 is a simplified flow diagram illustrating an example of a process for performing network traffic processing, according to one embodiment.

FIG. 9 is a simplified flow diagram illustrating an example of a process for performing network traffic processing, according to one embodiment. More particularly, FIG. 9 illustrates a process for performing BUM network traffic processing, in the manner of that discussed in operation 820 of FIG. 8. Such BUM network traffic processing begins with a determination as to whether the network traffic received by the provider edge node is incoming to the core network or outgoing from the core network (900). If the network traffic is outgoing from the core network (and so is received by the provider edge node at a network port coupled to the core network), outgoing BUM network traffic is processed (910). An example of such outgoing BUM network traffic processing is presented in greater detail in connection with FIG. 10, subsequently.

Alternatively, if the network traffic received by the provider edge node is incoming to the core network, the network traffic received on the pseudowire from the given access node is conveyed into the core by the provider edge node (920). A determination is then made as to whether the provider edge node in question has been elected as the designated forwarder for the redundancy group in question (930). In the case in which the provider edge node in question has been elected as the designated forwarder for the redundancy group, the network traffic received is sent to one or more other access nodes, as may be in the network segment (940). Alternatively, if the provider edge node in question has not been elected as the designated forwarder, the network traffic received by that provider edge node is blocked from being sent to other access nodes in the given network segment (950). In any of the three aforementioned situations, once such processing/forwarding/blocking has been performed, the process of performing BUM network traffic processing concludes.

Figure 10:
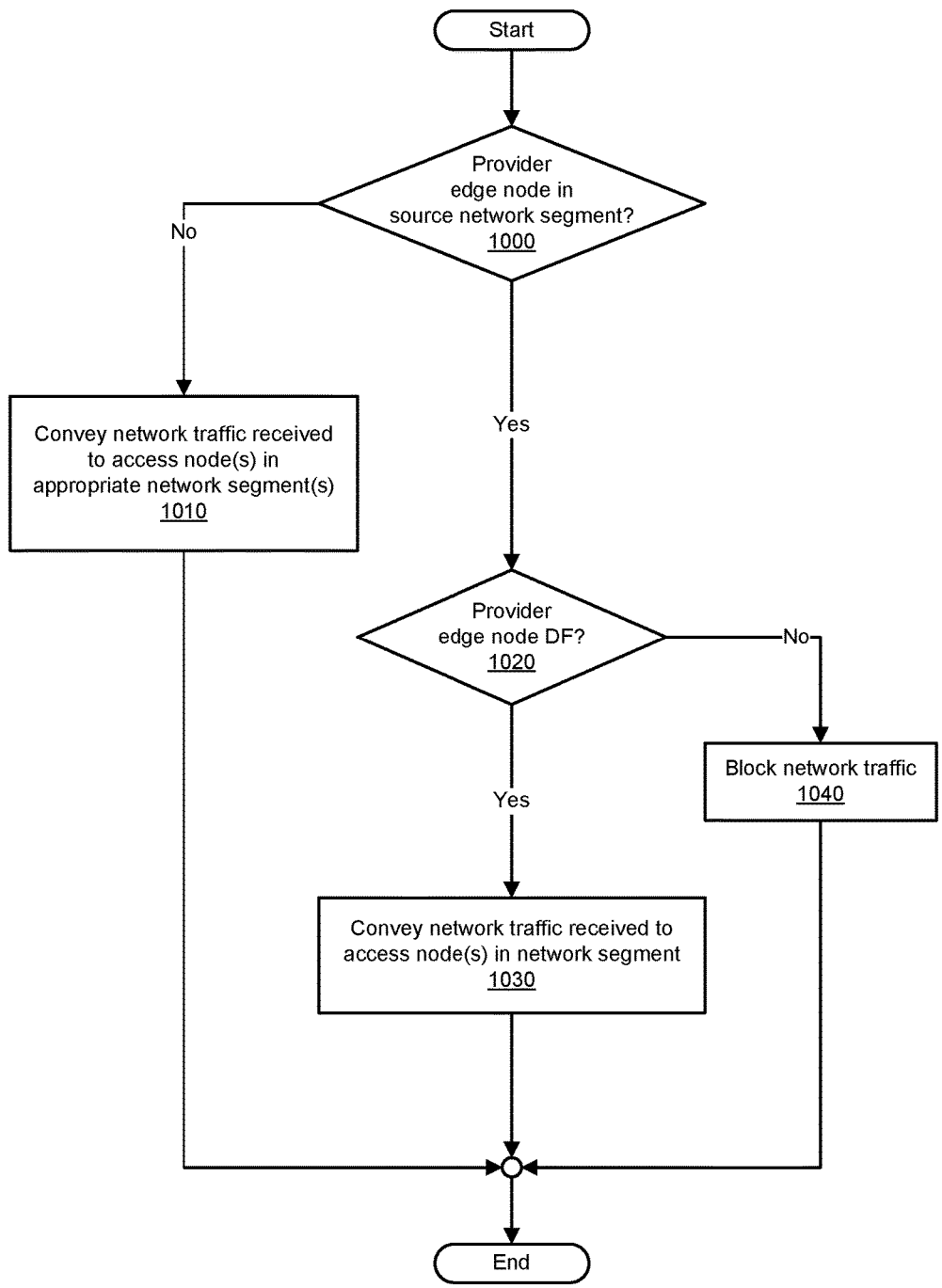
FIG. 10 is a simplified flow diagram illustrating an example of a process for processing outgoing network traffic, according to one embodiment.

FIG. 10 is a simplified flow diagram illustrating an example of a process for processing outgoing network traffic, according to one embodiment. As noted in the discussion of FIG. 9, FIG. 10 illustrates an example of operations that can be performed in processing outgoing (with respect to the core network) BUM network traffic. The process of FIG. 10 begins with a determination as to whether the provider edge node receiving the network traffic from the core network is within the source network segment for that traffic (1000). If the provider edge node receiving the network traffic is not within the source network segment, the network traffic thus received is conveyed to any access nodes that are within appropriate network segments to receive such network traffic (1010). The process then concludes.

Alternatively, if the provider edge node receiving the network traffic is within the source network segment, a determination is made as to whether the given provider edge node has been elected as the designated forwarder for the redundancy group (1020). If the given provider edge node is the designated forwarder in the redundancy group in question, the network traffic received by that provider edge node is forwarded to access nodes coupled thereto that are within the network segment in question (1030). Alternatively, if the provider edge node in question is not the elected designated forwarder, the network traffic received is blocked (1040). In either case, once the network traffic in question has either been conveyed or blocked, the process of performing outgoing BUM network traffic processing concludes.

Figure 11A:
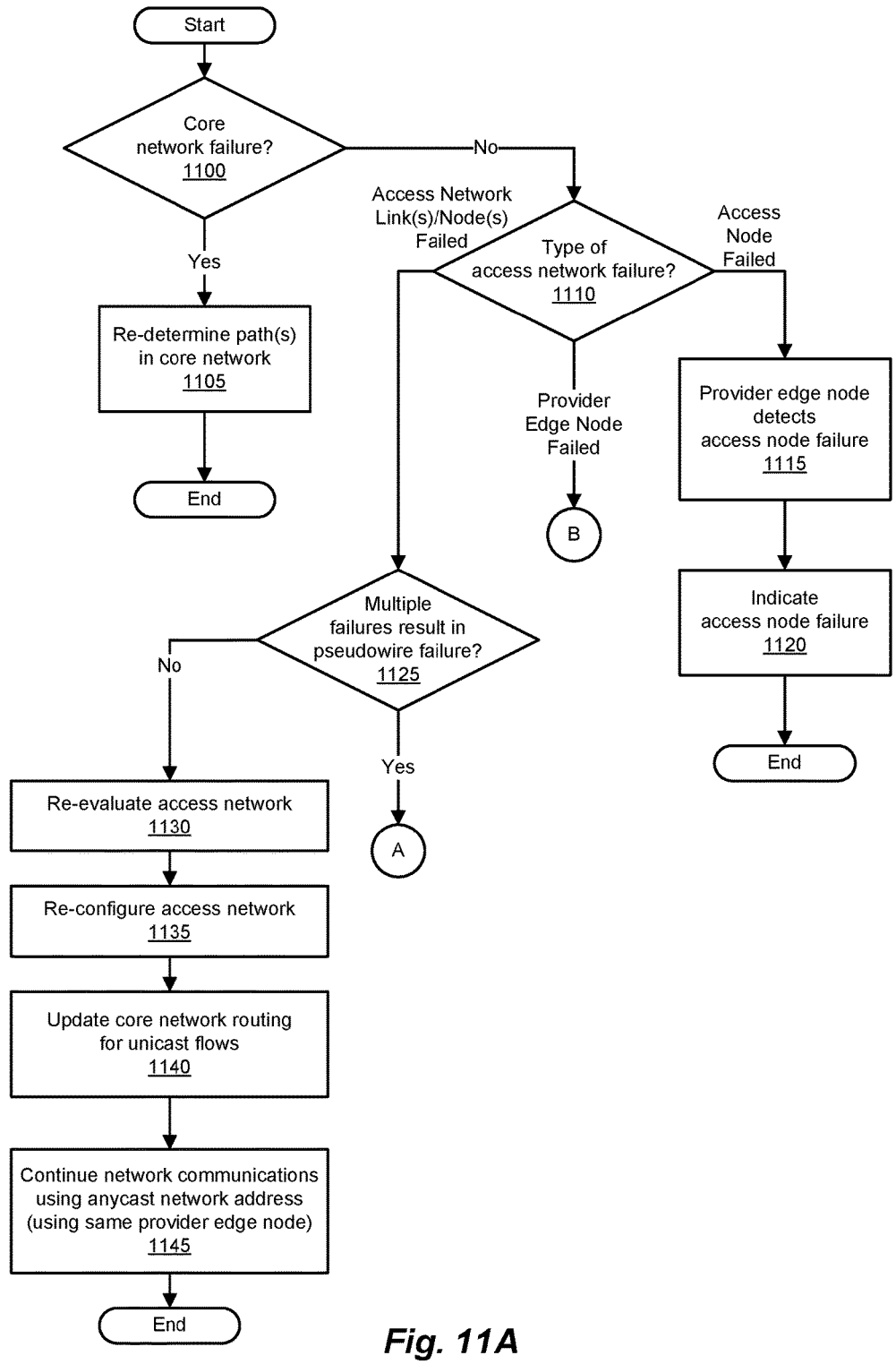
FIGS. 11A and 11B is a simplified flow diagram illustrating an example of a process for processing network failures, according to one embodiment.
Figure 11B:
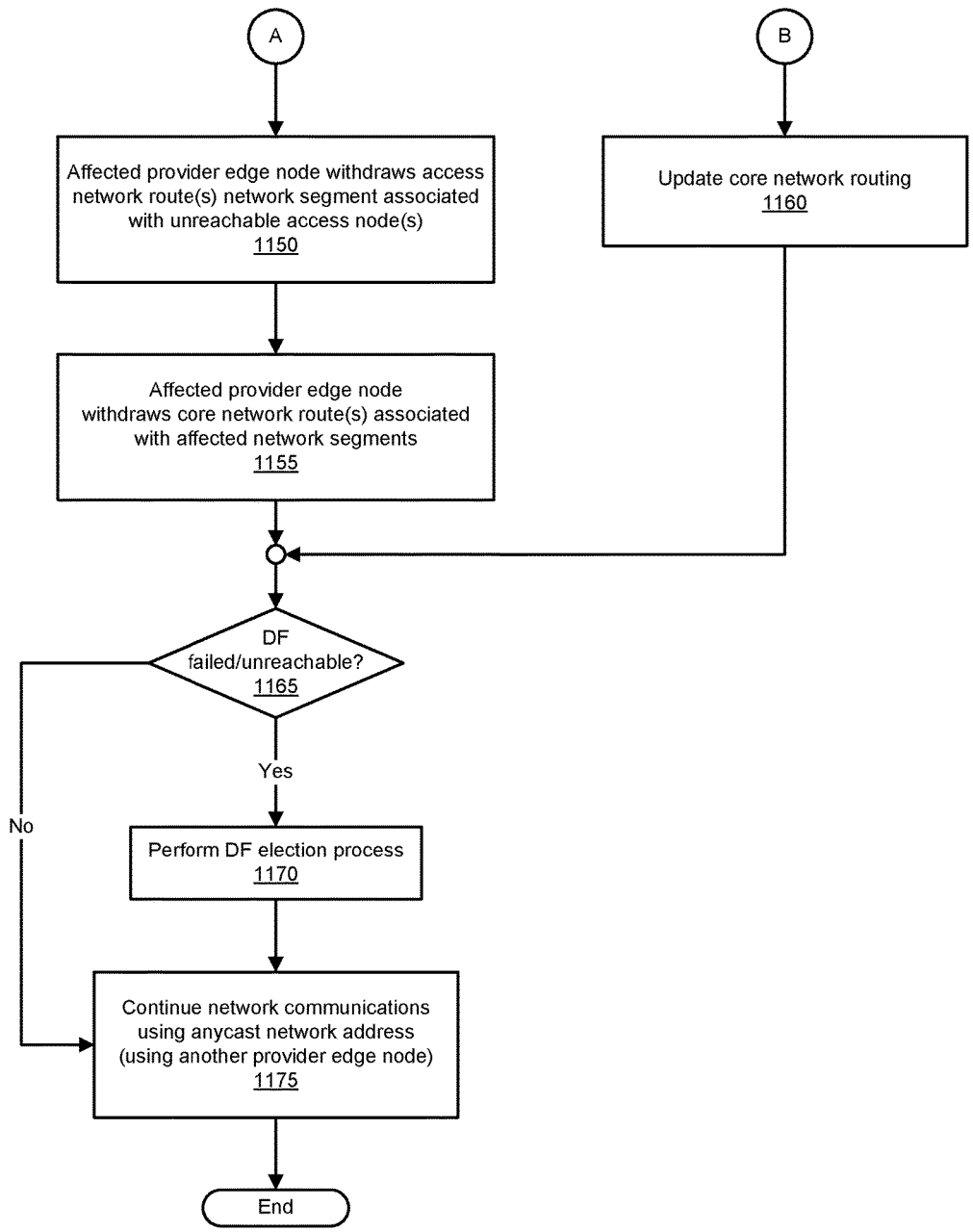

FIGS. 11A and 11B are simplified flow diagrams illustrating an example of a process for processing network failures, according to one embodiment. As depicted in FIG. 11A, the processing of failures affecting a given redundancy group begins with a determination as to whether the failure in question is a core network failure (1100). If the failure in question occurred within the core network, the affected routes within the core network are re-determined (1105). For example, in a provider core network employing the multi-protocol label switching (MPLS) protocol, the routes used by network traffic can be configured/reconfigured using a signaling protocol of some sort. For example, signaling protocols such as label distribution protocol (LDP; a simple, non-constrained (non-traffic engineering) protocol, resource reservation protocol with traffic engineering (RSVP-TE; a signaling protocol that also includes support for traffic-engineering via network resource reservations) can be used, either alone or in combination. The process then concludes.

In the case in which the failure has not occurred in the core network, but instead has occurred somewhere in the access network (that being between/including the given access node and the given provider edge node), a determination is made as to the type of access network failure that has occurred (1110). If the access network failure that has occurred is an access node failure, such access node failure is detected by the provider edge node (1115), and an indication to this effect is provided (1120). The process then concludes.

Alternatively, if one or more access network links and/or nodes have failed, a determination is made as to whether the failures in question have resulted in a pseudowire failure (1125). If the failures in question have not resulted in a pseudowire failure, the topology of the access network is reevaluated (1130). Such reevaluation can be effected by way of a gateway protocol such as IGP, or some other appropriate routing protocol (e.g., a protocol used for exchanging routing information between gateways (e.g., routers)).

Next, the topology of the access network (e.g., logical connections supported by the remaining access network nodes and links therebetween) are reconfigured (1135), for example, as part of the operation of the aforementioned gateway protocol(s). If the network traffic in question is a known unicast flow, core network routing can be updated to reflect the changes in topology of the access network (1140). At this juncture, network communications through the access network can be continued using the original anycast network device (and so, in this case, the same provider edge node) (1145). In the event that the failures in question have resulted in a pseudowire failure (1125), the process proceeds, by way of reference A, to FIG. 11B. Similarly, if the access network failure involved is the failure of the provider edge node in question, the process of processing a failure affecting the redundancy group proceeds, by way of reference B, to FIG. 11B.

At this juncture, transitioning now to reference A of FIG. 11B, the affected provider edge node, having determined that a pseudowire failure has occurred, withdraws access network routes related to the network segment(s) associated with the unreachable access node(s) (1150). Next, the affected provider edge node withdraws core network route(s) associated with the affected network segments (1155). Alternatively, starting with reference B, and so the failure of the provider edge node in question, the remote provider edge node updates the affected core network routing (1160).

In the event of either a pseudowire failure (thus resulting in an unreachable provider edge node, at least with respect to the network segment(s) in question) or a provider edge node failure (with effectively comparable results, though for potentially all such network segments, depending on the failure), the processing of failures affecting the redundancy group then proceeds to a determination as to whether the failed or unreachable provider edge node was the designated forwarder for the redundancy group in question (1165). If the provider edge node in question was the designated forwarder for the redundancy group, a designated forwarder election process is performed (1170). At this juncture (or if the provider edge node in question was not the designated forwarder), network communications within the access network proceed using the original anycast network address (though using the provider edge node elected as designated forwarder (that being reachable and operating)) (1175).

Additional Example Network Topologies

Figure 12:
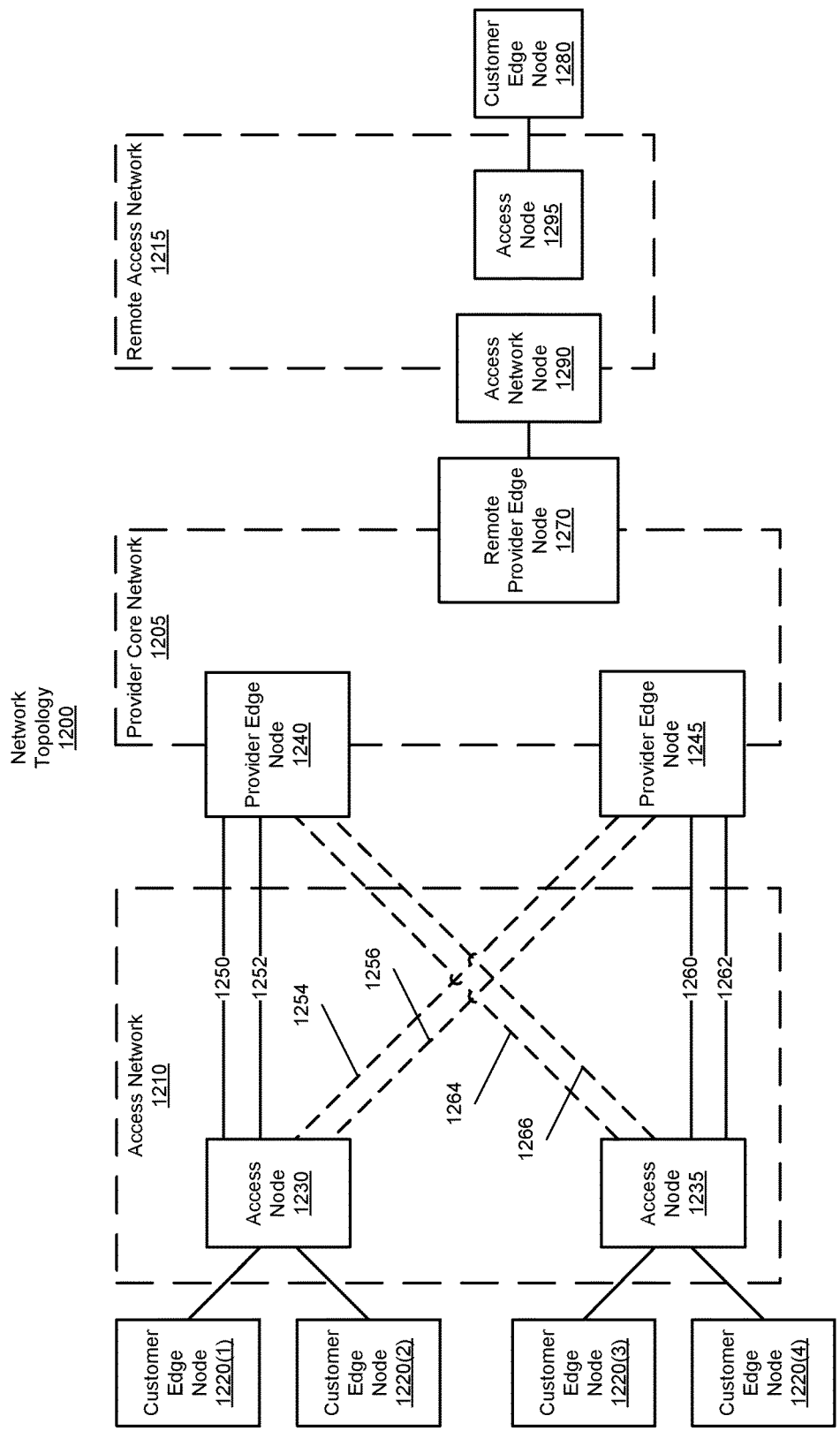
FIG. 12 is a block diagram illustrating an example of a simplified network topology, according to one embodiment.

FIG. 12 is a block diagram illustrating an example of a simplified network topology, according to one embodiment. FIG. 12 thus depicts a network topology 1200 that, in the manner of previous examples, includes a provider core network 1205, to which access networks 1210 and 1215 are coupled. In turn, coupled to access network 1210 are a number of customer edge nodes (depicted in FIG. 12 as customer edge nodes 1220(1)-(4)). Among other possible network devices within access network 1210 are access nodes 1230 and 1235. Access nodes 1230 and 1235 are in network communication with provider edge nodes 1240 and 1245 of provider core network 1205. In this example, access node 1230 facilitates network communications between customer edge node 1220(1) and provider edge nodes 1240 by way of a pseudowire 1250. Similarly, customer edge node 1220(2) is in network communication with provider edge node 1240 via access node 1230 and a pseudowire 1252. Customer edge nodes 1220(1) and 1220(2) are, respectively, also in network communication with provider edge node 1245 via access node 1230, and pseudowires 1254 and 1256. In comparable fashion, customer edge node 1220(3) and 1220(4) are in network communication with provider edge node 1245 via access node 1235, and, respectively, pseudowire 1260 and 1262. Customer edge nodes 1220(3) and 1220(4) are also in network communication, alternatively, with provider edge node 1240 via access node 1235, and, respectively, pseudowires 1264 and 1266. By way of various of the access nodes, provider edge nodes, and pseudowires therebetween, customer edge nodes 1220(1)-(4) are able to communicate with a remote provider edge node 1270 of provider core network 1205, and by extension, customer edge node 1280, by way of access network node 1290 and access node 1295.

In the manner noted earlier, one embodiment assigns a B-MAC (or comparable address) to each CE, for example by way of associating the CE's C-MAC with a different B-Client MAC. Thus, in the example presented in FIG. 12, customer edge nodes 1220(1)-(4) are each associated with a corresponding B-MAC address. In turn, as described in connection with FIG. 3, each of customer edge nodes 1220(1)-(4) communicate with provider edge nodes 1240 and 1245 via, for example, respective ones of pseudowires 1250, 1252, 1260, and 1262. As presented in FIG. 12, then, pseudowires 1250, 1252, 1260, and 1262 (as well as pseudowires 1254, 1256, 1264, and 1266) represent the various network segments to which access nodes 1230 and 1235 belong, and the redundancy groups to which provider edge nodes 1240 and 1245 belong.

Thus, with regard to the various network traffic flows that could occur in network topology 1200, a known unicast flow from customer edge node 1220(1) would travel from access node 1230 to provider edge node 1240 via pseudowire 1250, with a B-MAC identifying the source of the flow (access node 1230). This network traffic can traverse provider core network 1205, for example, to remote provider edge node 1270, and then on to access network node 1290 and access node 1295. In the case of known unicast network traffic, return network traffic travels along the same route in the opposite direction. In an ECMP situation (e.g., as between provider edge nodes 1240 and 1245 with respect to one of access nodes 1230 and 1235), a selection can be performed in the manner described earlier, and the network traffic in question forced to one of the provider edge nodes. This ensures that network traffic sent by the access nodes is destined for only one of the provider edge nodes in the redundancy group, even in ECMP situations.

With respect to BUM network traffic, the aforementioned dependence on network traffic direction arises. For BUM network traffic from remote provider edge node 1270, for example, the one of provider edge nodes 1240 and 1245 that is the elected DF handles sending the BUM network traffic into access network 1210 (e.g., via pseudowire 1250 to access node 1230, which can then convey the BUM network traffic to customer edge node 1220(1), for example).

Conversely, for BUM network traffic travelling from a customer edge node to, for example, a remote customer edge node (e.g., customer edge node 1280), DF election and filtering are employed to provide for such network communications, while also providing redundancy and loop avoidance. In the case in which the BUM network traffic is received on a provider edge node that has been elected DF, provider edge node 1240 has been elected DF, and the BUM network traffic in question is being sent from customer edge node 1220(1)/access node 1230 via pseudowire 1250. Provider edge node 1240 forwards the BUM network traffic to provider edge node 1245 and provider edge node 1270. Provider edge node 1270 forwards the BUM network traffic to access network node 1290, access node 1295, and customer edge node 1280, in the normal course. Provider edge node 1245 receives the BUM network traffic, and learns the C-MAC/B-MAC binding therefrom. Provider edge node 1245 does not send such BUM network traffic on the given network segment, because provider edge node 1245 is not the DF. Provider edge node 1245 also does not send the BUM network traffic to other access nodes to which provider edge node 1240 has also forwarded the BUM network traffic (e.g., access node 1230).

Alternatively, if the provider edge node receiving the BUM network traffic is not the provider edge node that has been elected DF for the given redundancy group (also referred to as a non-DF provider edge node), BUM network traffic is conveyed in an alternative fashion. For this example, provider edge node 1240 is a non-DF provider edge node, while provider edge node 1245 has been elected as the DF provider edge node. In such a case, BUM network traffic originating with customer edge node 1220(1)/access node 1230 and conveyed to provider edge node 1240 via pseudowire 1250. Thus, after being received by provider edge node 1240, the BUM network traffic is sent to provider edge node 1270, as before, and to provider edge node 1245. Provider edge node 1240 does not forward the BUM network traffic to access node 1235, as provider edge node 1240 is not the DF. Provider edge node 1245, having received the BUM network traffic via provider core network 1205 and being the DF, does forward the BUM network traffic to access node 1235. Further, based on the B-MAC addressing, provider edge node 1245 does not forward the BUM network traffic to access node 1230, in order to prevent looping the BUM network traffic back to its origin.

Figure 13:
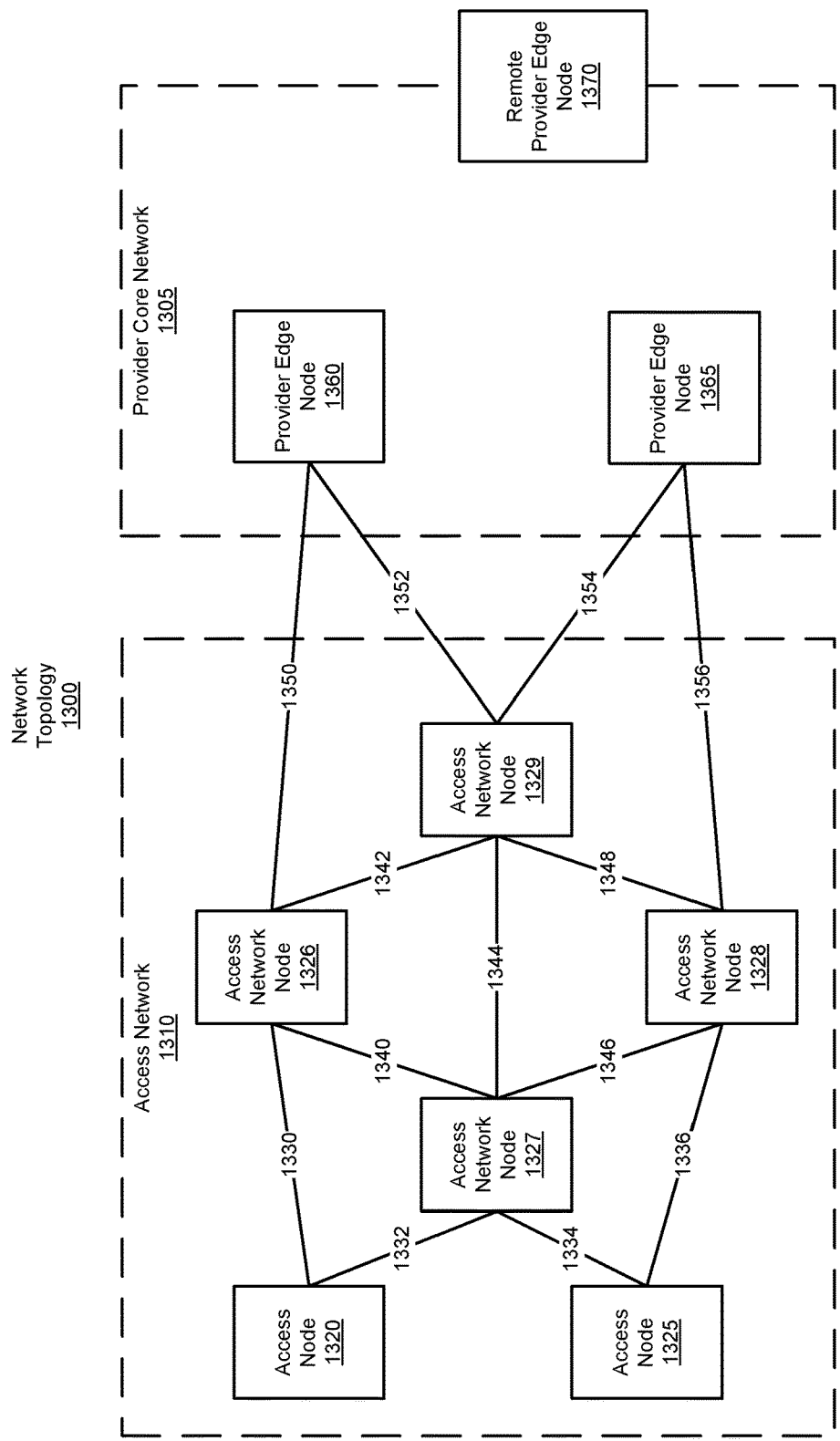
FIG. 13 is a block diagram illustrating an example of a simplified network topology, according to one embodiment.

FIG. 13 is a block diagram illustrating an example of a simplified network topology, according to one embodiment. FIG. 13 thus illustrates a network topology 1300, which is comparable to the examples described elsewhere herein, although simplified for ease of description. Network topology 1300 includes a provider core network 1305 and an access network 1310. In turn, access network 1310 includes access nodes 1320 and 1325, as well as access network nodes 1326, 1327, 1328, and 1329. Linking access nodes 1320 and 1325, and access network nodes 1326, 1327, and 1328 are network connections 1330, 1332, 1134, and 1336. Linking access network nodes 1326, 1327, 1328, and 1329 to one another are network connections 1340, 1342, 1344, 1346, and 1348. Linking access network nodes 1326, 1328, and 1329 to provider core network 1305 are network connections 1350, 1352, 1354, and 1356. Provider core network 1305, in supporting the aforementioned network communications, includes provider edge nodes 1360 and 1365, as well as a remote provider edge node 1370. As observed earlier, network topology 1300 depicts only those network devices salient to the following discussions.

As noted in connection with the process depicted in FIGS. 11A and 11B, a number of failure scenarios can be managed by methods and systems such as those described herein, in a network topology such as network topology 1300. For example, a link/node failure in access network 1310 that results only in the need to perform a re-determination of the network connections can be managed. For link or node failures in the access network (e.g., a failure of network connection 1330), which do not cause access nodes 1320 and 1325 to completely lose connectivity to provider edge nodes 1330 and 1335, the failure triggers the gateway protocol (e.g., IGP) to recalculate the shortest path. This may cause the anycast network traffic from some access nodes to be steered towards new provider edge nodes. However, no action is required in the control plane on the provider edge nodes. Remote provider edge nodes (e.g., remote provider edge node 1370) can automatically update their C-MAC/B-MAC associations through data-plane learning. No transient loops occur, and the convergence time is a function of how quickly the IGP can re-converge.

The failure scenario in which a provider edge node failure (e.g., the failure of provider edge node 1360) is addressed by the fact that the tunnels use anycast addresses. The access nodes do not need to explicitly react to the failure in any particular way, as the gateway protocol (e.g., IGP) re-convergence takes care of the fail-over procedures. B-MAC routes advertised by the failed provider edge node are withdrawn, which in turn flushes the C-MACs associated with those B-MACs on the remote provider edge nodes. If this happens before any new traffic arrives from an affected customer edge node via the new provider edge node, temporary flooding occurs, but as soon as the affected remote provider edge nodes start receiving traffic from the associated C-MACs over the new provider edge node, the remote provider edge nodes update their C-MAC/B-MAC bindings through normal data-plane learning.

Another possibility is the failure of a tunnel, which occurs when there is no viable path within the access network between the access node and a provider edge node. This scenario might occur in network topology 1300 as the result of the failure of network connections 1330, 1340, 1342, and 1352, thereby isolating provider edge node 1360 from access network 1310. A provider edge node such as provider edge node 1360 can detect such conditions by using mechanisms provided by the gateway protocol employed, for example (e.g., the IGP route watch mechanism). Upon detecting such a failure, provider edge node 1360 reacts with two actions:

Provider edge node 1360 withdraws the network segment routes associated with the unreachable access node (e.g., access node 1320); and Provider edge node 1360 withdraws the MAC advertisement routes associated with the B-MAC(s) of the affected network segments.

Similar to the failure of a provider edge node discussed above, the failure of a tunnel may result in temporary flooding from remote provider edge nodes until traffic starts flowing in the other direction from the customer edge nodes.

Another potential failure is the failure of an access node (e.g., the failure of access node 1320). From the perspective of a provider edge node, such a failure is handled in the same fashion as the failure of a tunnel. If the customer edge node connected to the failed access node is single-homed, then no redundancy would be available.

Alternative Example Processes

Figure 14:
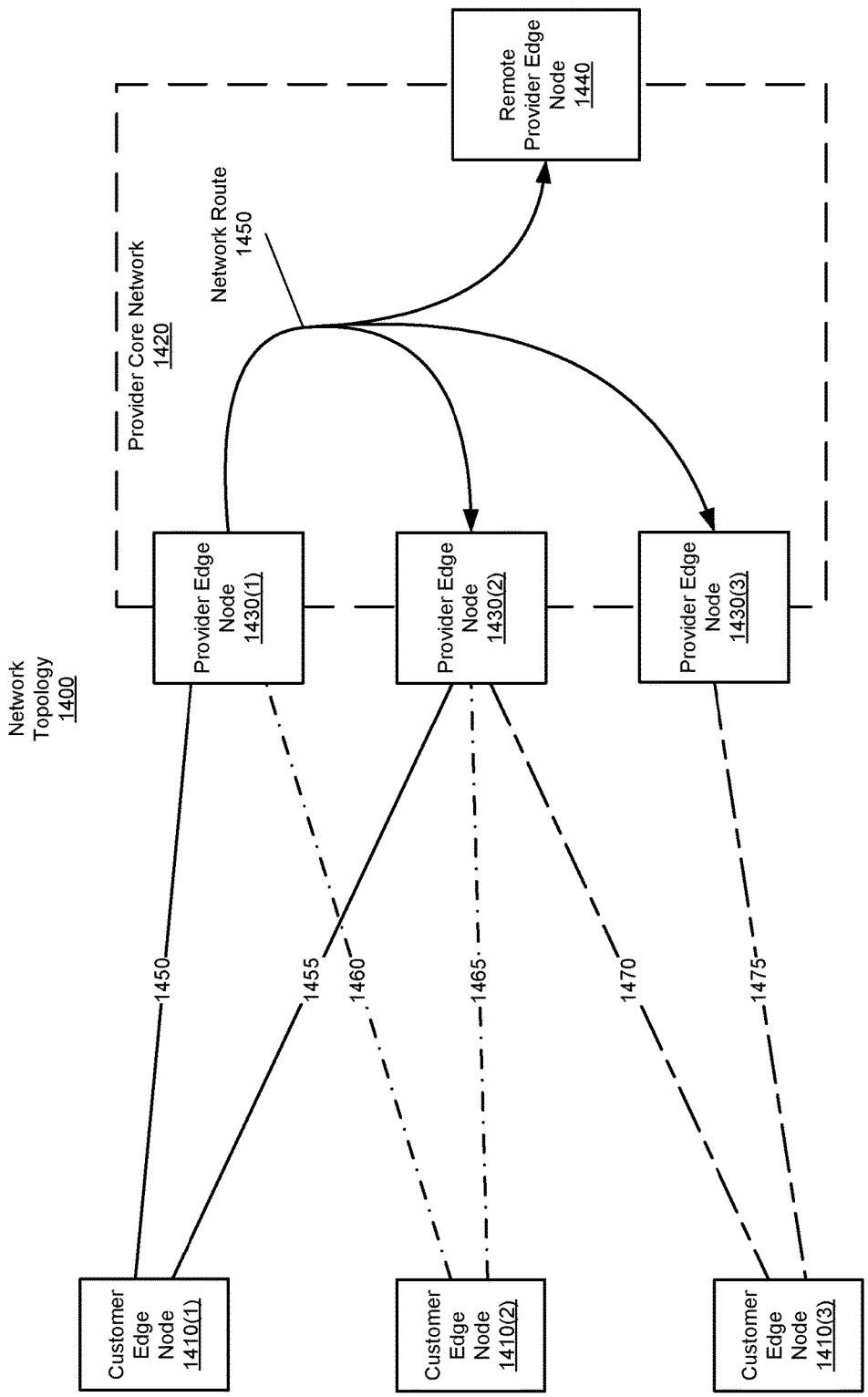
FIG. 14 is a block diagram illustrating an example of a simplified network topology, according to one embodiment.

FIG. 14 is a block diagram illustrating an example of a simplified network topology, according to one embodiment. FIG. 14 thus depicts a network topology 1400, which is greatly simplified for purposes of the following discussion. Network topology 1400 includes a number of customer edge nodes (depicted in FIG. 14 as customer edge nodes 1410 (1)-(3)), which provide their respective networks with access to a provider core network 1420. Provider core network 1420 includes a number of provider edge nodes (depicted in FIG. 14 as provider edge nodes 1430(1)-(3), and remote provider edge node 1440). Based on their network addresses (e.g., assigned B-MAC addresses), the customer edge nodes depicted in FIG. 14 are in network communication with various respective ones of the provider edge nodes depicted therein. Thus, customer edge node 1410(1) is in network communication with provider edge node 1430(1) (by way of a pseudowire 1450) and provider edge node 1430(2) (by way of a pseudowire 1455). Similarly, customer edge node 1410(2) is in network communication with provider edge node 1430(1) (by way of a pseudowire 1460) and provider edge node 1430(2) (by way of a pseudowire 1465). Also similarly, customer edge node 1410(3) is in network communications with provider edge node 1430(2) (by way of a pseudowire 1470) and provider edge node 1430(3) (by way of a pseudowire 1475).

As will be apparent in light of the present disclosure, network communications from customer edge node 1410(1)-(3) are conveyed to one or more of provider edge node 1430(1)-(3), through the various network devices of provider core network 1420, to remote provider edge node 1440, for subsequent delivery to access networks and customer edge nodes coupled thereto. Conversely, in methods and systems such as those disclosed herein, network communications from such access networks and customer edge nodes can travel back to customer edge nodes 1410(1)-(3) by way of remote provider edge node 1440 and the other network devices of provider core network 1420. Further, such network communications (e.g., by way of network route 1450) can make their way from provider edge node 1430(1) to provider edge nodes 1430(2) and 1430(3), as well as remote provider edge nodes 1440, by way of network route 1450 through provider core network 1420.

The mechanisms described previously herein require the allocation of a B-MAC address per tunnel (i.e., per CE). For large-scale deployments, B-MAC address allocation and the maintenance of such information can result in a large number of B-MAC addresses needing to be maintained and managed by each provider edge node. This can translate into increased storage and computational requirements. A more optimal B-MAC address allocation mechanism can reduce such demands.

In order to reduce the number of B-MAC addresses required per PE, a "local bias" mechanism can be implemented. This assigns a single B-MAC address to each PE for its network segments (as opposed to one B-MAC for each network segment). With respect to known unicast network traffic, the operations are similar to those described earlier, albeit with a single source B-MAC address being used for network traffic arriving at the PE from the network segments associated with the tunnels.

With respect to BUM network traffic, the operations to be performed can be broken down to three different scenarios. For BUM network traffic arriving from a network segment, the PE follows the local bias mechanisms. That is, it floods the BUM network traffic over all other local network segments in the same bridge-domain, irrespective of DF election state. The PE also floods the traffic over the MPLS backbone.

With respect to BUM network traffic from a PE in a redundancy group (BUM network traffic arriving from another ingress PE in the same redundancy group), the PE inspects the source B-MAC address in the received packets to identify the proper replication list for the service identifier in question. This replication list excludes network segments that are in common with the ingress PE (to prevent loops). The PE floods the BUM network traffic over all network segments in that specific replication list, subject to the DF filtering constraints (i.e., the PE in question is the DF for that network segment).

With respect to BUM network traffic arriving from a remote PE (ingress) that has no segments in common with the PE at egress, the latter again examines the source B-MAC address in the packets to identify the replication list for the service identifier in question. This replication list includes the network segments that are in the associated bridge-domain. The (egress) PE floods the traffic over those network segments while observing the DF filtering rules.

With regard to network topology 1400, an example of the foregoing approach can be presented. In this example, two techniques are used to allow a single address (e.g., B-MAC) to be used on a per-PE basis, rather than on a per-CE basis. In this example, provider edge node 1430(2) has been elected DF, leaving provider edge nodes 1430(1) and 1430(3) as non-DF PEs. Also in this example, according to the techniques described above, the source B-MAC is the B-MAC of provider edge node 1430(1), while the destination B-MAC is that of the multicast address corresponding to the service instance (the service instance associated with the tunnel/pseudowire). Customer edge nodes 1410(1) and 1410(2) are thus members of the same network segment. The source of the BUM network traffic is customer edge node 1410(1), which sends the BUM network traffic on pseudowire 1450.

Provider edge node 1430(1) forwards the BUM network traffic to remote provider edge node 1440. Provider edge nodes 1430(2) and 1430(3) also receive the BUM network traffic via provider core network 1420. Provider edge node 1430(1) does not forward the BUM network traffic to customer edge node 1410(2) because provider edge node 1430(1) is not the elected DF. Provider edge node 1430(2) does not forward the BUM network traffic to customer edge node 1410(2), as the result of the local-bias, split-horizon filtering performed by provider edge node 1430(2) (despite being elected as the DF). As a result of being the DF (and the local-bias, split-horizon filtering not blocking the forwarding), however, provider edge node 1430(2) does forward the BUM network traffic to customer edge node 1410(3). However, as a result of provider edge node 1430(3) being a non-DF PE, provider edge node 1430(3) does not forward the BUM network traffic to customer edge node 1410(3). Thus, the appropriate network devices in network topology 1400 receive the BUM network traffic, but do not receive duplicate traffic.

An Example Computing and Network Environment

As shown above, the systems described herein can be implemented using a variety of computer systems and networks. Examples of such computing and network environments are described below with reference to FIGS. 15 and 16.

Figure 15:
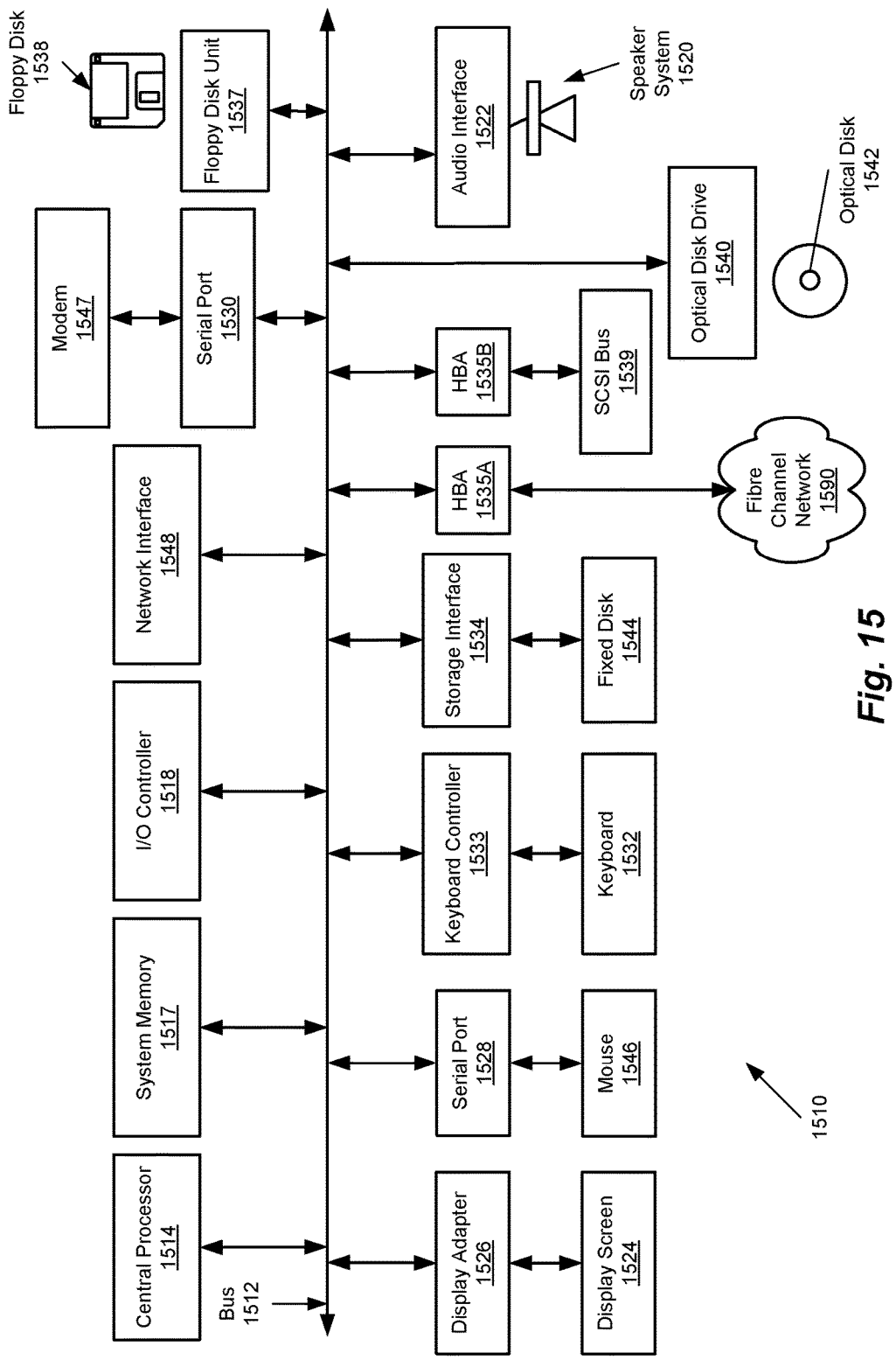
FIG. 15 is a simplified block diagram illustrating components of an example computer system, which can be used in the implementation of embodiments such as those described herein.

FIG. 15 depicts a block diagram of a computer system 1510 suitable for implementing aspects of the systems described herein, and the like. Computer system 1510 includes a bus 1512 which interconnects major subsystems of computer system 1510, such as a central processor 1514, a system memory 1517 (typically RAM, but which may also include ROM, flash RAM, or the like), an input/output controller 1518, an external audio device, such as a speaker system 1520 via an audio output interface 1522, an external device, such as a display screen 1524 via display adapter 1526, serial ports 1528 and 1530, a keyboard 1532 (interfaced with a keyboard controller 1533), a storage interface 1534, a floppy disk drive 1537 operative to receive a floppy disk 1538, a host bus adapter (HBA) interface card 1535A operative to connect with a Fibre Channel network 1590, a host bus adapter (HBA) interface card 1535B operative to connect to a SCSI bus 1539, and an optical disk drive 1540 operative to receive an optical disk 1542. Also included are a mouse 1546 (or other point-and-click device, coupled to bus 1512 via serial port 1528), a modem 1547 (coupled to bus 1512 via serial port 1530), and a network interface 1548 (coupled directly to bus 1512).

Bus 1512 allows a network communication between central processor 1514 and system memory 1517, which may include read-only memory (ROM) or flash memory (neither shown), and random access memory (RAM) (not shown), as previously noted. RAM is generally the main memory into which the operating system and application programs are loaded. The ROM or flash memory can contain, among other code, the Basic Input-Output System (BIOS) which controls basic hardware operation such as the interaction with peripheral components. Applications resident with computer system 1510 are generally stored on and accessed from a computer-readable storage medium, such as a hard disk drive (e.g., fixed disk 1544), an optical drive (e.g., optical drive 1540), a floppy disk unit 1537, or other computer-readable storage medium.

Storage interface 1534, as with the other storage interfaces of computer system 1510, can connect to a standard computer-readable medium for storage and/or retrieval of information, such as a fixed disk drive 1544. Fixed disk drive 1544 may be a part of computer system 1510 or may be separate and accessed through other interface systems. Modem 1547 may provide a direct connection to a remote server via a telephone link or to the Internet via an internet service provider (ISP). Network interface 1548 may provide a direct connection to a remote server via a direct network link to the Internet via a POP (point of presence). Network interface 1548 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 15 need not be present to practice the systems described herein. The devices and subsystems can be interconnected in different ways from that shown in FIG. 15. The operation of a computer system such as that shown in FIG. 15 is readily known in the art and is not discussed in detail in this application. Code to implement the modules of the systems described herein can be stored in computer-readable storage media such as one or more of system memory 1517, fixed disk 1544, optical disk 1542, or floppy disk 1538. The operating system provided on computer system 1510 may be MS-WINDOWS®, UNIX®, Linux®, or other operating system.

Further, and as will be appreciated in light of the present disclosure, each of the operations described herein may be executed by a module (e.g., a software module) or a portion of a module, or a computer system user. Thus, the above-described method, the operations thereof and modules therefor may be executed on a computer system configured to execute the operations of the method and/or may be executed from computer-readable storage media. The method may be embodied in a machine-readable and/or computer-readable storage medium for configuring a computer system to execute the method. Thus, the software modules may be stored within and/or transmitted to a computer system memory to configure the computer system to perform the functions of the module.

The software modules described herein may be received by a computer system, for example, from computer-readable storage media. Such computer readable storage media may be permanently, removably or remotely coupled to the computer system. Computer-readable storage media may non-exclusively include, for example, any number of the following: magnetic storage media (including disk and tape storage media); optical storage media such as compact disk media (e.g., CD ROM, CD R, etc.) and digital video disk storage media; nonvolatile memory storage memory including semiconductor-based memory units such as FLASH memory, EEPROM, EPROM, ROM or application specific integrated circuits; and volatile storage media (including registers, buffers or caches, main memory, RAM, etc.). In a UNIX-based embodiment, the software modules may be embodied in a file, which may be a device, a terminal, a local or remote file, a socket, or other such element. Other new and various types of computer-readable storage media may also be used to store the software modules discussed herein.

Many other devices or subsystems (not shown) may be connected in a similar manner (e.g., bar code readers, document scanners, digital cameras and so on). Conversely, it is not necessary for all of the devices shown in FIG. 15 to be present to practice the present invention. The devices and subsystems may be interconnected in different ways from that shown in FIG. 15. The operation of a computer system such as that shown in FIG. 15 is readily known in the art and is not discussed in detail in this application. Code to implement the present invention may be stored in computer-readable storage media such as one or more of system memory 1516, fixed disk 1544, CD-ROM 1542, or floppy disk 1538. Additionally, computer system 1510 may be any kind of computing device, and so includes personal data assistants (PDAs), network appliance, X-window terminal or other such computing device. Computer system 1510 also supports a number of Internet access tools, including, for example, an HTTP-compliant web browser having a JavaScript interpreter, such as Netscape Navigator®, Microsoft Internet Explorer® and the like.

Moreover, regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 16:
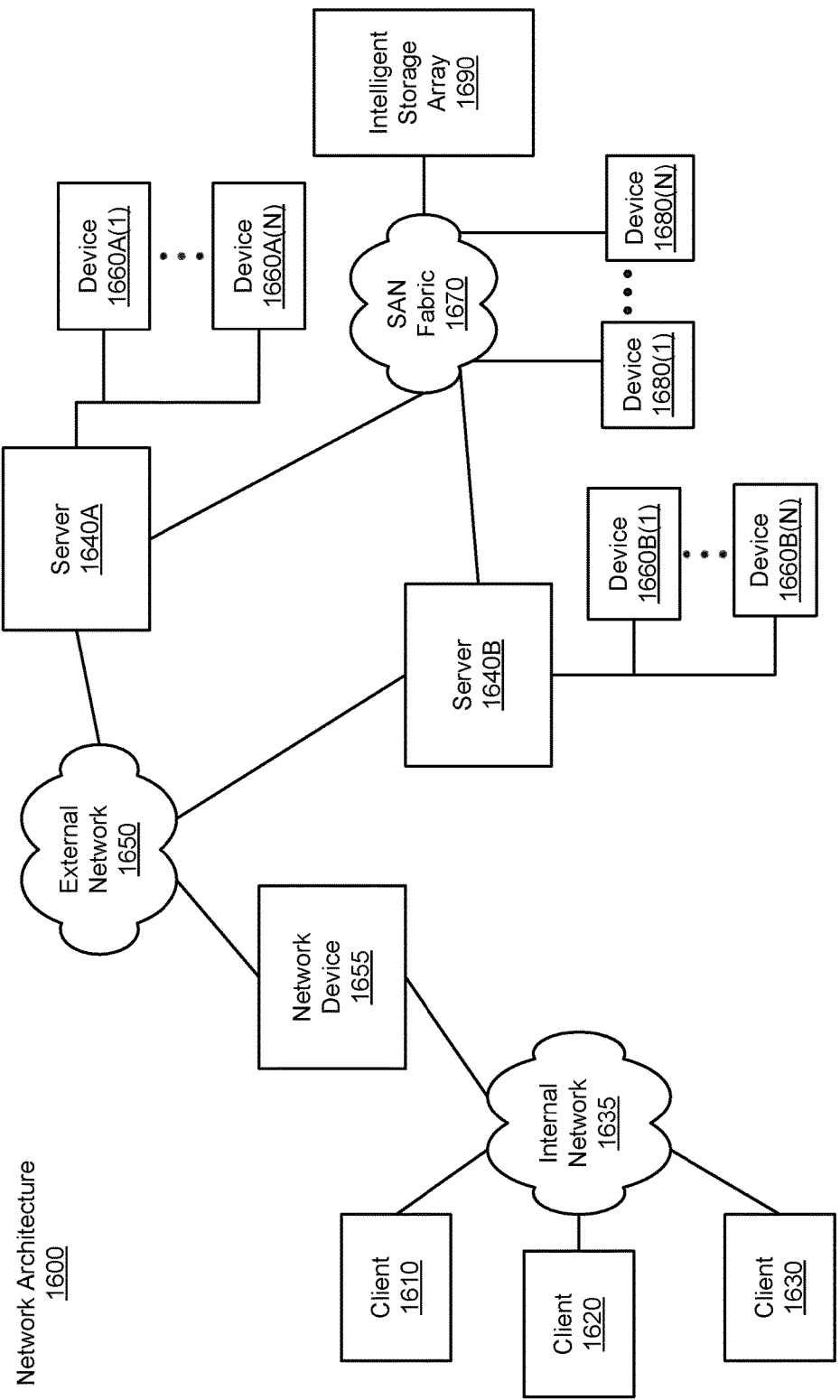
FIG. 16 is a simplified block diagram of a network architecture, in which embodiments such as those described herein can be implemented.

FIG. 16 is a block diagram depicting a network architecture 1600 in which client computer systems 1610, 1620 and 1630 are coupled to one another by an internal network 1135, as well as storage servers 1640A and 1640B (any of which can be implemented using computer system 1610), are coupled to an external network 1650. Internal network 1135 and external network 1650 are communicatively coupled to one another, in turn, by a network device 1655, in the manner of network device 160 and/or network device 404.

Storage server 1640A is further depicted as having storage devices 1660A(1)-(N) directly attached, and storage server 1640B is depicted with storage devices 1660B(1)-(N) directly attached. Storage servers 1640A and 1640B are also connected to a SAN fabric 1670, although connection to a storage area network is not required for operation. SAN fabric 1670 supports access to storage devices 1680(1)-(N) by storage servers 1640A and 1640B, and so by client systems 1610, 1620 and 1630 via external network 1650. Intelligent storage array 1690 is also shown as an example of a specific storage device accessible via SAN fabric 1670.

With reference to computer system 1510, modem 1547, network interface 1548 or some other method can be used to provide connectivity from each of client computer systems 1610, 1620 and 1630 to external network 1650. Client systems 1610, 1620 and 1630 are able to access information on storage server 1640A or 1640B using, for example, a web browser or other client software (not shown). Such a client allows client systems 1610, 1620 and 1630 to access data hosted by storage server 1640A or 1640B or one of storage devices 1660A(1)-(N), 1660B(1)-(N), 1680(1)-(N) or intelligent storage array 1690. FIG. 18 depicts the use of a network such as the Internet for exchanging data, but the systems described herein are not limited to the Internet or any particular network-based environment.

The foregoing described embodiments wherein the different components are contained within different other components (e.g., the various elements shown as components of computer system 1510, discussed subsequently). It is to be understood that such depicted architectures are merely examples, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

Example Networking Device

As shown above, the present disclosure can be implemented using a variety of computer systems and networks. An example of one such computing environment is described below with reference to FIG. 17.

Figure 17:
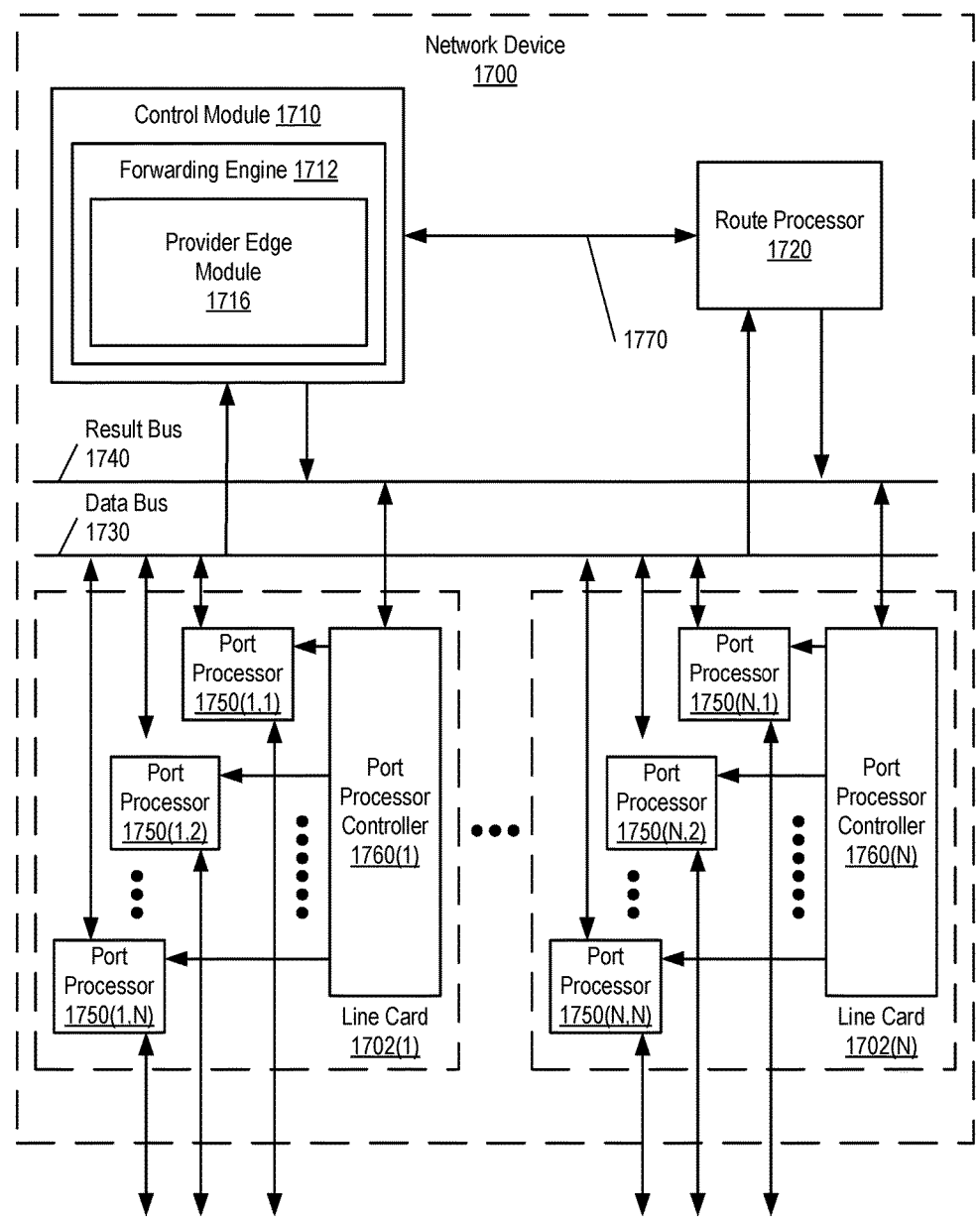
FIG. 17 is a block diagram illustrating components of an example networking device, which can be used in the implementation of embodiments such as those described herein.

FIG. 17 is a block diagram illustrating components of an example networking device 1700, which depicts (at least in part) one configuration of a network device or a network routing element (e.g., a hub, router, switch, or similar device). As such, it will be appreciated that networking device 1700 supports certain networking protocols (e.g., such as those described herein, as well as, potentially, other networking protocols), which send information in units of network communications such as packets, datagrams, frames, and the like.

In the present depiction, networking device 1700 includes a number of line cards (line cards 1702(1)-1202(N)) that are communicatively coupled to a control module 1710 (which can include a forwarding engine, such as forwarding engine 1712). Forwarding engine 1712, in turn, can be configured to effect protocols and methods such as those described herein. To that end, in order to perform operations such as those described in connection with FIGS. 4-11B, for example, a provider edge module can be implemented.

Networking device 1700 is also depicted as including a traffic control (or flow control) processor (depicted as a route processor 1720), to which line cards 1702(1)-1202(N) are also coupled. Line 1702(1)-1202(N) are coupled to control module 1710 and route processor 1720 via a data bus 1730 and a result bus 1740. Line cards 1702(1)-(N) include a number of port processors 1750(1,1)-1250(N,N) which are controlled by port processor controllers 1760(1)-1260(N). It will also be noted that control module 1710 and route processor 1720 are not only coupled to one another via data bus 1730 and result bus 1740, but are also communicatively coupled to one another by a communications link 1770. It is noted that in alternative embodiments, each line card can include its own forwarding engine.

When a packet is received by a network device or network routing element such as networking device 1700, the packet can be identified and analyzed in the following manner. Upon receipt, a packet (or some or all of its control information) is sent from one of the port processors 1750(1,1)-1250(N,N) at which the packet was received to one or more of those devices coupled to data bus 1730 (e.g., others of port processors 1750(1,1)-1250(N,N), a forwarding engine such as forwarding engine 1712, and/or route processor 1720). Handling of the packet can be performed, for example, by a forwarding engine in accordance with the systems and methods disclosed herein. For example, a forwarding engine may determine that the packet should be forwarded to one or more of port processors 1750(1,1)-1250(N,N). This can be accomplished by indicating to a corresponding one(s) of port processor controllers 1760(1)-1260(N) that the copy of the packet held in the given one(s) of port processors 1750(1,1)-1250(N,N) should be forwarded to the appropriate one of port processors 1750(1,1)-1250(N, N).

Networking device 1700 can be used, for example, in the implementation of a network device or a network routing element by way of control module 1710, or in one or more of port processor controllers 1760(1)-1260(N) and/or in route processor 1720, in order to implement the present disclosure. Although not shown, network device 1700 can also be used to implement a routing protocol module (not shown) and/or network reachability protocol module (not shown) in control module 1710, in one of port processor controllers 1760(1)-1260(N), and/or in route processor 1720. In so doing, a provider edge node such as one of the provider edge nodes described earlier can be implemented.

An incoming packet can be provided to a network device or network routing element via a forwarding engine or port processor of a line card coupled to a port that received the incoming packet. Network device 1700 can be configured to process the incoming packet and to generate one or more outgoing packets, as described throughout this disclosure.

The outgoing packet can be provided to a forwarding engine by a network device or a network routing device, which can determine that the outgoing packet should be forwarded to one or more of port processors 1750(1,1)-1250(N,N) that are configured to transmit the outgoing packet toward the outgoing packet's destination. As noted with regard to other systems described herein, networking device 1700 includes one or more processors (e.g., microprocessors, PLDs (Programmable Logic Devices), or ASICs (Application Specific Integrated Circuits)) configured to execute program instructions stored in computer readable storage media of various types, including RAM (Random Access Memory), ROM (Read Only Memory), Flash memory, MEMS (Micro Electro-Mechanical Systems) memory, and the like.

Other Embodiments

The systems described herein are well adapted to attain the advantages mentioned as well as others inherent therein. While such systems have been depicted, described, and are defined by reference to particular descriptions, such references do not imply a limitation on the claims, and no such limitation is to be inferred. The systems described herein are capable of considerable modification, alteration, and equivalents in form and function, as will occur to those ordinarily skilled in the pertinent arts in considering the present disclosure. The depicted and described embodiments are examples only, and are in no way exhaustive of the scope of the claims.

The foregoing detailed description has set forth various embodiments of the systems described herein via the use of block diagrams, flowcharts, and examples. It will be understood by those within the art that each block diagram component, flowchart step, operation and/or component illustrated by the use of examples can be implemented (individually and/or collectively) by a wide range of hardware, software, firmware, or any combination thereof.

The systems described herein have been described in the context of fully functional computer systems; however, those skilled in the art will appreciate that the systems described herein are capable of being distributed as a program product in a variety of forms, and that the systems described herein apply equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative and should not be taken to be limiting. As will be appreciated in light of the present disclosure, other embodiments are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the claims. Variations and modifications of the embodiments disclosed herein can be made based on the description set forth herein, without departing from the scope of the claims, giving full cognizance to equivalents thereto in all respects.

Although the systems described herein have been described in connection with several embodiments, these embodiments and their descriptions are not intended to be limited to the specific forms set forth herein. On the contrary, it is intended that such embodiments address such alternatives, modifications, and equivalents as can be reasonably included within the scope of the appended claims.

What is claimed is:

1. A method comprising:
    receiving a network communication at a network device of a redundancy group, wherein
        the network device is a provider edge node that is configured to be coupled to a first network and a second network,
        the first network is an access network comprising a plurality of access nodes,
        the second network is a provider core network, and
        the redundancy group comprises a plurality of network devices that is addressed in the first network using an anycast address;
    determining whether the network communication was received from the first network or the second network;
    determining a status of the network device in the redundancy group;
    in response to the network communication having been received from the first network,
        forwarding the network communication into the second network,
        in response to a determination that the status of the network device indicates that the network device is a designated forwarder, forwarding the network communication to another of the plurality of access nodes from the network device, and
        in response to a determination that the status of the network device indicates that the network device is not the designated forwarder, blocking the network communication from being forwarded to any of the plurality of access nodes from the network device; and
    in response to the network communication having been received from the second network,
        determining whether to forward the network communication into the first network based, at least in part, on
            the status of the network device, and
            a result of a filtering operation.

2. The method of claim 1, wherein the forwarding the network communication into the second network comprises:
    determining whether the network communication is known unicast network traffic or broadcast/unknown unicast/multicast (BUM) network traffic.

3. The method of claim 2, further comprising:
    forwarding the network communication to a remote network device at a network address in the second network; and
    if the network communication is BUM network traffic, forwarding the network communication to other network devices of the plurality of network devices.

4. The method of claim 1, further comprising:
    if the network communication was received from the provider core network,
        determining whether the provider edge node is in a source network segment; and
    if the provider edge node is not in the source network segment,
        determining a status of the provider edge node, wherein the network communication was received from one of the plurality of access nodes,
        if the status of the provider edge node indicates that the provider edge node is a designated forwarder, forwarding the network communication to another of the plurality of access nodes from the provider edge node, and
        if the status of the provider edge node indicates that the provider edge node is not the designated forwarder, blocking the network communication from being forwarded to any of the plurality of access nodes from the provider edge node.

5. The method of claim 4, further comprising:
    if the provider edge node is not in the source network segment, forwarding the network communication in another network segment.

6. The method of claim 1, further comprising:
detecting a failure;
determining whether the failure occurred in the access network; and
if the failure occurred in the access network, determining a type of access network failure, wherein
the type of access network failure is one of
a link failure,
a pseudowire failure, or
a provider edge node failure.

7. The method of claim 6, further comprising:
if the failure is a link failure,
performing a gateway protocol distance calculation, and
reconfiguring the access network based on a result of the gateway protocol distance calculation.

8. The method of claim 6, further comprising:
if the failure is a pseudowire failure,
withdrawing an access network route for a network segment,
withdrawing a provider core network route associated with the network segment,
determining if the provider edge node is a designated forwarder, and
if the provider edge node is the designated forwarder, performing a designated forwarder process for the redundancy group.

9. The method of claim 6, further comprising:
if the failure is a provider edge node failure,
updating routing information for the provider core network,
determining if the provider edge node is a designated forwarder, and
if the provider edge node is the designated forwarder, performing a designated forwarder process for the redundancy group.

10. The method of claim 1, further comprising:
if the network communication was received from the provider core network, determining whether the network communication is broadcast/unknown unicast/ broadcast (BUM) network traffic;
if the network communication is BUM network traffic, determining whether a destination network segment of the BUM network traffic and a source network segment of the BUM network traffic are the same; and
if the destination network segment and the source network segment are the same, using split-horizon filtering to block the BUM network traffic.

11. The method of claim 10, further comprising:
if the network communication uses a provider backbone bridging-Ethernet virtual private network (PBB-EVPN) protocol,
configuring each network device in the redundancy group to identify the same network segment by a different backbone-media access control (B-MAC) address.

12. A network device comprising:
one or more processors;
a first network interface, coupled to the one or more processors and configured to be coupled to a first network that is an access network comprising a plurality of access nodes;
a second network interface, coupled to the one or more processors and configured to be coupled to a second network that is a provider core network;
a computer-readable storage medium, coupled to the one or more processors; and
a plurality of instructions, encoded in the computer-readable storage medium and configured to cause the one or more processors to
receive a network communication at the network device, wherein
the network device belongs to a redundancy group,
the network device is a provider edge node, and
the redundancy group comprises a plurality of network devices that is addressed in the first network using an anycast address,
determine whether the network communication was received from the first network or the second network,
determining a status of the network device in the redundancy group,
in response to the network communication having been received from the first network,
forward the network communication into the second network,
in response to a determination that the status of the network device indicates that the network device is a designated forwarder, forward the network communication to another of the plurality of access nodes from the network device, and
in response to a determination that the status of the network device indicates that the network device is not the designated forwarder, block the network communication from being forwarded to any of the plurality of access nodes from the network device, and
in response to the network communication having been received from the second network,
determine whether to forward the network communication into the first network based, at least in part, on
the status of the network device, and
a result of a filtering operation.

13. The network device of claim 12, wherein the plurality of instructions configured to cause the one or more processors to forward the network communication into the second network are further configured to cause the one or more processors to:
determine whether the network communication is known unicast network traffic or broadcast/unknown unicast/ multicast (BUM) network traffic.

14. The network device of claim 13, wherein the plurality of instructions are further configured to cause the one or more processors to:
forward the network communication to a remote network device at a network address in the second network; and
if the network communication is BUM network traffic, forward the network communication to other network devices of the plurality of network devices.

15. The network device of claim 12, wherein the plurality of instructions are further configured to cause the one or more processors to:
if the network communication was received from the provider core network,
determine whether the provider edge node is in a source network segment; and
if the provider edge node is in the source network segment,
determine a status of the provider edge node, wherein
the network communication was received from one of the plurality of access nodes,
if the status of the provider edge node indicates that the provider edge node is a designated forwarder, forward the network communication to another of the plurality of access nodes from the provider edge node, and if the status of the provider edge node indicates that the provider edge node is not the designated forwarder, block the network communication from being forwarded to any of the plurality of access nodes from the provider edge node.

16. The network device of claim 12, wherein the plurality of instructions are further configured to cause the one or more processors to:

detect a failure;

determine whether the failure occurred in the access network; and if the failure occurred in the access network, determine a type of access network failure, wherein
the type of access network failure is one of
a link failure,
a pseudowire failure, or
a provider edge node failure.

17. The network device of claim 16, wherein the plurality of instructions are further configured to cause the one or more processors to:

if the failure is a link failure,
perform a gateway protocol distance calculation, and
reconfigure the access network based on a result of the gateway protocol distance calculation;

if the failure is a pseudowire failure,
withdraw an access network route for a network segment,
withdraw a provider core network route associated with the network segment,
determine if the provider edge node is a designated forwarder, and
if the provider edge node is the designated forwarder, perform a designated forwarder process for the redundancy group; and if the failure is a provider edge node failure,
update routing information for the provider core network,
determine if the provider edge node is a designated forwarder, and
if the provider edge node is the designated forwarder, perform a designated forwarder process for the redundancy group.

18. The network device of claim 12, wherein the plurality of instructions are further configured to cause the one or more processors to:

if the network communication was received from the provider core network, determine whether the network communication is broadcast/unknown unicast/broadcast (BUM) network traffic;

if the network communication is BUM network traffic, determine whether a destination network segment of the BUM network traffic and a source network segment of the BUM network traffic are the same; and if the destination network segment and the source network segment are the same, use split-horizon filtering to block the BUM network traffic.

19. The network device of claim 18, wherein the plurality of instructions are further configured to cause the one or more processors to:

if the network communication uses a provider backbone bridging-Ethernet virtual private network (PBB-EVPN) protocol,
configure each network device in the redundancy group to identify the same network segment by a different backbone-media access control (B-MAC) address.

20. A computer program product comprising:
a plurality of instructions, comprising
a first set of instructions, executable on a network device, configured to receive a network communication at the network device, wherein
the network device is configured to belong to a redundancy group,
the network device is a provider edge node that is configured to be coupled to a first network and a second network,
the first network is an access network comprising a plurality of access nodes,
the second network is a provider core network, and
the redundancy group comprises a plurality of network devices that is addressed in the first network using an anycast address,
a second set of instructions, executable on the network device, configured to determine whether the network communication was received from the first network or the second network,
a third set of instructions, executable on the network device, configured to determine a status of the network device in the redundancy group,
a fourth set of instructions, executable on the network device, configured to, in response to the network communication having been received from the first network,
forward the network communication into the second network,
in response to a determination that the status of the network device indicates that the network device is a designated forwarder, forward the network communication to another of the plurality of access nodes from the network device, and
in response to a determination that the status of the network device indicates that the network device is not the designated forwarder, block the network communication from being forwarded to any of the plurality of access nodes from the network device, and
a fifth set of instructions, executable on the network device, configured to, in response to the network communication having been received from the second network,
determine whether to forward the network communication into the first network based, at least in part, on
the status of the network device, and
a result of a filtering operation; and
a non-transitory computer-readable storage medium, wherein the instructions are encoded in the non-transitory computer-readable storage medium.

21. The computer program product of claim 20, wherein the fourth set of instructions further comprise:
a first subset of instructions, executable on the network device, configured to determine whether the network communication is known unicast network traffic or broadcast/unknown unicast/multicast (BUM) network traffic;
a second subset of instructions, executable on the network device, configured to forward the network communication to a remote network device at a network address in the second network; and a third subset of instructions, executable on the network device, configured to, if the network communication is BUM network traffic, forward the network communication to other network devices of the plurality of network devices.

22. The computer program product of claim 20, wherein the plurality of instructions further comprise:
- a sixth set of instructions, executable on the network device, configured to, if the network communication was received from the provider core network, determine whether the provider edge node is in a source network segment; and
- a second set of instructions, executable on the network device, configured to, if the provider edge node is in the source network segment,
  - determine a status of the provider edge node, wherein the network communication was received from one of the plurality of access nodes,
  - if the status of the provider edge node indicates that the provider edge node is a designated forwarder, forward the network communication to another of the plurality of access nodes from the provider edge node, and
  - if the status of the provider edge node indicates that the provider edge node is not the designated forwarder, block the network communication from being forwarded to any of the plurality of access nodes from the provider edge node.

* * * * *